(12) United States Patent
Belling et al.

(10) Patent No.: US 12,369,565 B1
(45) Date of Patent: Jul. 29, 2025

(54) LIVESTOCK MEDICINAL APPLICATOR SYSTEM

(71) Applicant: Belling & Meyer, LLC, Granger, IA (US)

(72) Inventors: Dakota C. Belling, Granger, IA (US); Eugene T. Meyer, Ames, IA (US)

(73) Assignee: Bovi-Jet, Inc., Granger, IA (US)

( * ) Notice: Subject to any disclaimer, the term of this patent is extended or adjusted under 35 U.S.C. 154(b) by 0 days.

(21) Appl. No.: 18/806,673

(22) Filed: Aug. 15, 2024

Related U.S. Application Data

(60) Provisional application No. 63/533,065, filed on Aug. 16, 2023.

(51) Int. Cl.
*A01K 13/00* (2006.01)
*A01K 1/06* (2006.01)

(52) U.S. Cl.
CPC .......... *A01K 13/003* (2013.01); *A01K 1/0613* (2013.01)

(58) Field of Classification Search
CPC .................................................. A01K 1/0613
See application file for complete search history.

(56) References Cited

U.S. PATENT DOCUMENTS

| | | | | |
|---|---|---|---|---|
| 876,631 A | * | 1/1908 | Goff ...................... | A01K 13/003 119/669 |
| 1,129,977 A | * | 3/1915 | Hagny .................. | A01K 13/003 239/49 |

(Continued)

FOREIGN PATENT DOCUMENTS

| | | | | |
|---|---|---|---|---|
| AU | 9473030 A | * | 4/1995 | .......... A01K 13/003 |
| CN | 105230506 A | * | 1/2016 | |

(Continued)

OTHER PUBLICATIONS

"Simcro, PowerMaster Pour On Applicator" (Online Product Listing) www.simcro.com/product/powermaster-pour-on/. Sep. 29, 2023, Retrieved from Wayback Machine, https://web.archive.org/web/20230929004515/https://simcro.com/product/powermaster-pour-on/ on Dec. 19, 2024.

(Continued)

*Primary Examiner* — Morgan T Jordan
(74) *Attorney, Agent, or Firm* — Nyemaster Goode P.C.

(57) ABSTRACT

A livestock treatment application system that may be retrofitted onto existing animal processing structures. The livestock treatment application system typically includes an application subsystem that only applies one or more livestock treatment liquid to an upward-facing surface of an animal. The application subsystem may include at least one livestock treatment liquid containing container, an electromechanical pump fluidly connected to the at least one livestock treatment liquid containing container via at least one flexible fluid transport line where the at least one flexible fluid transport line interconnects the at least one livestock treatment liquid containing container and the electromechanical pump and a nozzle, and a user activated switch on an exterior surface of the waterproof junction box configured to activate the electromechanical pump and dispense the at least one livestock treatment liquid upon activation of the user activated switch by a user; and a dosing selection subsystem system.

20 Claims, 22 Drawing Sheets

(56) References Cited

U.S. PATENT DOCUMENTS

| | | | | |
|---|---|---|---|---|
| 1,273,311 | A * | 7/1918 | Barnes | A01K 13/001 4/601 |
| 1,412,468 | A * | 4/1922 | Edward | A01K 13/003 239/581.1 |
| 1,577,938 | A * | 3/1926 | Stanton | A01K 13/003 119/656 |
| 1,767,560 | A * | 6/1930 | Snyder | A01K 13/003 119/667 |
| 2,133,898 | A * | 10/1938 | Mansfield | A01K 13/003 184/6 |
| 2,542,280 | A * | 2/1951 | Knapp | A01K 13/003 119/667 |
| 2,652,810 | A * | 9/1953 | Paul, Jr. | A01K 13/003 239/654 |
| 3,108,574 | A * | 10/1963 | Albers | A01K 13/001 119/669 |
| 3,496,914 | A * | 2/1970 | Cowan | A01K 13/003 119/667 |
| 3,602,199 | A * | 8/1971 | Diggs | A01K 13/003 119/667 |
| 3,699,928 | A * | 10/1972 | Cowan | A01K 13/003 119/667 |
| 3,884,191 | A * | 5/1975 | Stout | A01K 13/001 119/671 |
| 3,884,192 | A * | 5/1975 | Knapp | A01K 13/003 119/667 |
| 3,889,881 | A | 6/1975 | Cunningham et al. | |
| 3,949,709 | A * | 4/1976 | Myers | A01K 13/003 119/667 |
| 4,126,104 | A * | 11/1978 | Overby | A01K 13/003 119/667 |
| 4,342,285 | A * | 8/1982 | James | A01K 13/003 119/843 |
| 4,987,861 | A * | 1/1991 | Lemire | A01K 13/003 119/667 |
| 5,027,747 | A * | 7/1991 | Talley | A01K 13/003 119/660 |
| 5,063,880 | A * | 11/1991 | Bouthillier | A01K 13/001 119/667 |
| 5,758,603 | A * | 6/1998 | Vivier | A01K 13/003 119/669 |
| 5,950,562 | A * | 9/1999 | Schulte | A01K 1/0023 119/51.02 |
| 5,988,113 | A * | 11/1999 | Zhioua | A01K 13/003 119/657 |
| 6,230,660 | B1 * | 5/2001 | Greeson | A01K 13/003 119/656 |
| 6,520,118 | B2 * | 2/2003 | Swiegers | A01K 13/003 119/666 |
| 6,625,302 | B2 * | 9/2003 | Kalscheur | A22B 5/007 382/110 |
| 6,864,914 | B1 * | 3/2005 | Birk | A01K 29/005 348/14.03 |
| 6,966,276 | B2 * | 11/2005 | Dollar | A01K 13/003 119/669 |
| 7,156,053 | B2 * | 1/2007 | Cortner, Jr. | A01K 13/003 119/656 |
| 7,987,815 | B2 * | 8/2011 | Van Den Berg | A01K 1/0017 119/51.02 |
| 8,438,996 | B2 * | 5/2013 | Greeson | A01M 7/0092 119/665 |
| 11,375,695 | B2 * | 7/2022 | Gribble | A01K 1/0011 |
| 2001/0010208 | A1* | 8/2001 | Greeson | A01K 13/003 119/665 |
| 2002/0066415 | A1* | 6/2002 | Swiegers | A01K 13/003 119/666 |
| 2005/0005872 | A1* | 1/2005 | Greeson | A01K 13/003 119/665 |
| 2005/0115515 | A1* | 6/2005 | Dollar | A01K 13/003 119/669 |
| 2005/0124968 | A1* | 6/2005 | Mollhagen | A61D 7/00 604/506 |
| 2009/0031965 | A1* | 2/2009 | Campbell | A01K 13/003 119/652 |
| 2010/0160809 | A1* | 6/2010 | Laurence | A01K 29/005 604/890.1 |
| 2010/0170446 | A1* | 7/2010 | Manneke | A01K 1/12 119/14.08 |
| 2011/0120385 | A1* | 5/2011 | Jones | A01K 13/003 222/406 |
| 2012/0090551 | A1* | 4/2012 | Guajardo Torres | A01K 13/001 119/671 |
| 2013/0125830 | A1* | 5/2013 | Denning | A01K 13/002 119/650 |
| 2014/0299069 | A1* | 10/2014 | Greeson | A01K 13/003 119/651 |
| 2015/0100037 | A1* | 4/2015 | Allsup | A01K 13/002 119/51.01 |
| 2015/0230428 | A1* | 8/2015 | Fussell, Jr. | A01K 13/003 119/667 |
| 2018/0343831 | A1* | 12/2018 | Greeson | A01K 13/001 |
| 2019/0104703 | A1* | 4/2019 | Sandoval | A01K 13/003 |
| 2019/0387708 | A1* | 12/2019 | Fussell, Jr. | A01K 13/003 |
| 2023/0012610 | A1* | 1/2023 | Goldenberg | A61D 3/00 |

FOREIGN PATENT DOCUMENTS

| | | | | |
|---|---|---|---|---|
| CN | 111096235 | A * | 5/2020 | |
| EP | 1238581 | A2 * | 9/2002 | A01K 13/001 |
| GB | 2106364 | A * | 4/1983 | A01K 13/003 |
| GB | 2335340 | A * | 9/1999 | A01K 13/001 |
| WO | WO-9006675 | A * | 6/1990 | A01K 11/006 |
| WO | WO-9812915 | A1 * | 4/1998 | A01K 13/001 |
| WO | WO-9953750 | A1 * | 10/1999 | A01K 13/003 |
| WO | WO-0078132 | A1 * | 12/2000 | A01K 13/003 |
| WO | WO-2009046561 | A2 * | 4/2009 | A01K 13/00 |

OTHER PUBLICATIONS

"Te Pari, Revolution Dosing Gun—70ML Barrel—Smart Model" (Online Product Listing) www.tepari.com/us/products/dosing-guns/revolution-dosing-guns/revolution-dosing-gun-70ml-barrel-smart-model-2/. Jun. 13, 2024, Retrieved from Wayback Machine, https://web.archive.org/web/20240613113518/https://www.tepari.com/us/products/dosing-guns/revolution-dosing-guns/revolution-dosing-gun-70ml-barrel-smart-model-2/ on Dec. 19, 2024.

"Fussell Farms, The Cow Sprayer" (Online Product Listing) https://fussellfarmsinc.com/automated-sprayers/. Jun. 25, 2024, Retrieved from Wayback Machine, https://web.archive.org/web/20240625061330/https://fussellfarmsinc.com/automated-sprayers/ on Dec. 19, 2024.

"3-D Cattle Equipment, LLC, automatic sprayer" (Online Product Listing) https://3dcattle.com/index.html. Jul. 18, 2024, Retrieved from Wayback Machine, https://web.archive.org/web/20240718070656/https://3dcattle.com/index.html on Dec. 19, 2024.

"Zoetis Cattle, Dectomax Pour-On Applicator" https://www.youtube.com/watch?v=VD1WmlMNTNE. Aug. 29, 2019, Retrieved from https://www.youtube.com/watch?v=VD1WmIMNTNE on Dec. 27, 2024.

* cited by examiner

| MEDICATION NAME | RATIO | |
|---|---|---|
| EXIT GOLD SYNERGIZED | 1.5 mL PER 100 LBS | + |
| BANAMINE TRANSDERMAL | 3 mL PER 100 LBS | + |
| CLEAN UP II | 3 mL PER 100 LBS | + |
| IVERMAX (IVERMECTIN) | 1 mL PER 22 LBS | + |

CANCEL

FIG. 23

LIVESTOCK MEDICINAL APPLICATOR SYSTEM

CROSS REFERENCE TO RELATED APPLICATION

This application claims priority to U.S. Provisional Application No. 63/533,065, filed on Aug. 16, 2023, entitled "CATTLE MEDICINAL APPLICATOR SYSTEM," the entire disclosure of which is incorporated herein by reference.

BACKGROUND

Cattle are affected by a variety of internal and external insects, parasites, and diseases that can affect their weight gain, ability to produce milk, grazing efficiency, and leather quality including, but not limited to: flies, ticks, biting and grinding lice, stomach worms, lung worms, grubs, and mange mites. To counteract these parasites, cattle producers sometimes manually apply treatment chemicals to the cattle directly to kill or dissuade the parasites. Typically, this is done with a pour-on-product. Cattle are herded into a narrow alleyway or channel that only single bovine or other cattle can pass through at a time. Typically, a worker will then apply the pour-on-product to the back of the cow as it passes through the alleyway using a pour-on-product dispensing gun. This is very labor intensive because workers are needed to both apply the chemical treatment to the cattle and herd the cattle into the alleyway and manage the cattle movement through the process. This also takes a great deal of time depending on the size of the herd of cattle being treated and carries with it risk of overapplication or improper application due to the extensive human involvement in the process at all or virtually all stages.

SUMMARY

An aspect of the present disclosure is a retrofit livestock chemical treatment application system that applies one or more treatment chemicals to livestock. The livestock chemical treatment application system may be retrofitted onto an existing livestock chute or tunnel system so that a user may automatically apply treatment chemicals to a livestock within the chute or tunnel without using a manually operated medicine sprayer or gun. The livestock chemical treatment application system includes a microcontroller to operate the electrical components of the system. There is at least one chemical container housing the one or more treatment chemicals.

The livestock chemical treatment application system also includes a pump, which is connected to the chemical container via a fluid transport line. The pump is signal communication with the microcontroller. There is also a spray nozzle portion that is fluidly connected to the pump via the fluid transport line. The spray nozzle portion is positioned somewhere along the top end of the livestock chute or tunnel so that is pointing down where a livestock would pass by. The livestock chute or tunnel may be a squeeze chute, where livestock are secured/immobilized one at a time within the squeeze chute. The livestock chemical treatment application system would apply the treatment chemicals once the livestock is secured. Alternatively, the livestock chute or tunnel may be an unobstructed tunnel, through which multiple livestock pass through in single file. One or more sensors are placed within the tunnel. In this case, the livestock chemical treatment application system applies treatment chemicals when the livestock has reached a predetermined position within the tunnel as detected by the sensors.

Another aspect of the disclosure is a retrofit livestock chemical treatment application system that applies treatment chemicals to livestock and retrofitted to a livestock gate or chute comprising and having an adaptable spraying nozzle. The retrofit livestock chemical treatment application system includes a microcontroller, a chemical container housing for the treatment chemicals, at least one sensor for detecting a livestock in livestock gate or chute, a pump that is fluidly connected to the chemical container. The pump is in signal communication with the microcontroller. A fluid transport line connects the pump and the chemical container. The retrofit livestock chemical treatment application system also has an adjustable spray nozzle portion. The spray nozzle portion is fluidly connected to the fluid transport line and is located near a top end of the livestock gate or chute. It is oriented downwards into the livestock gate or chute. It has a cylindrical main body, a fluid transport line engaging portion that extends upwardly from the cylindrical main body, and a nozzle engaging cavity within the cylindrical main body. An internal channel runs through the fluid transport line engaging portion which lines up with the inside of the fluid transport line when the nozzle adaptor is attached to it. Multiple locking channels are disposed on an inner surface of the nozzle engaging cavity. The locking channels allow an adaptable nozzle to interface with the nozzle adaptor by having extended projections that slide into the locking channels.

Yet another aspect of the present disclosure includes a retrofit livestock chemical treatment application system that applies one or more treatment chemicals to livestock and retrofitted to an existing livestock gate or chute. The retrofit livestock chemical treatment application system is integrated with a software application held on an external computing device, typically a mobile computing device such as a smart phone. The retrofit livestock chemical treatment application system includes a microcontroller, at least one chemical container, at least one sensor, a pump that is fluidly connected to the at least one chemical container, and a spray nozzle portion fluidly connected to the at least one storage container ad the pump. The spray nozzle is oriented into the livestock gate or chute. The software application is linked to a user operated computing device and the microcontroller so that the system can be controlled and monitored by a user with the user operated computing device. The software application includes a user interface displayed to a user on a screen of the user operated computing device. Pens are displayed to the user on the user interface where the one or more pens corresponds to an existing animal pen or enclosure. A number of selectable medicine types are stored in a database connected to the software application, and are viewable and changeable by a user. The user selects a particular type of medicine when they use the system of the present disclosure, and the chosen medicine corresponds to the medicine that has been stored within the chemical container. The selectable medicine types have a weight volume ratio associated with them. The weight volume ratio corresponds to an amount of treatment chemicals that should be used per a unit of weight of a livestock in the livestock gate or chute.

Another aspect of the present disclosure is generally directed to a livestock treatment application system that includes: an application subsystem and a dosing subsystem. The application subsystem only applies one or more livestock treatment liquid to an upward-facing surface of an animal and includes: at least one livestock treatment liquid containing container that is housing one or more livestock treatment liquid chosen from the group consisting of a livestock treatment drug, a livestock nutritional supplement and mixtures thereof; and an electromechanical pump, wherein the electromechanical pump is fluidly connected to the at least one livestock treatment liquid containing container via at least one flexible fluid transport line that is flexible by hand and without the use of tools and wherein the at least one flexible fluid transport line interconnects the at least one livestock treatment liquid containing container and the one or more livestock treatment liquid therein with the electromechanical pump and a nozzle, and wherein the electromechanical pump is in signal communication with a microcontroller; and wherein the nozzle is fluidly connected to the electromechanical pump via the flexible fluid transport line, and wherein the nozzle is located proximate a top end of a livestock gate or chute and oriented downwards into the livestock gate or the chute such that the nozzle directs the at least one or more livestock treatment liquid onto the back of the animal within the livestock gate or the chute.

The microcontroller is typically contained within a waterproof junction box having a door and in wired or wireless electrical signal communication with at least each of the following: the electromechanical pump; and a user activated switch on an exterior surface of the waterproof junction box configured to activate the electromechanical pump and dispense the at least one livestock treatment liquid upon activation of the user activated switch by a user. The dosing selection subsystem system is typically chosen from the group consisting of: a potentiometer within the waterproof junction box having a dose selection interface displayed to a user on the exterior surface of the waterproof junction box that is configured to be changed by the user by hand and without the use of tools such that the user may select a dose of the at least one livestock treatment liquid to be delivered through the nozzle and onto the upward-facing surface of a livestock; and at least one load cell in wired or wireless communication with the microcontroller wherein the at least one load cell provides a signal to the microcontroller that identifies a weight of the livestock to be treated by the application subsystem and wherein the microcontroller calculates or identifies the dose of the livestock treatment liquid to be applied to the livestock.

Another aspect of the present disclosure is generally directed toward a livestock treatment application system that includes an application subsystem that only applies one or more livestock treatment liquid to an upward-facing surface of an animal where the application subsystem includes at least one livestock treatment liquid containing container that is housing one or more livestock treatment liquid and an electromechanical pump within a waterproof junction box, wherein the electromechanical pump is fluidly connected to the at least one livestock treatment liquid containing container via at least one flexible fluid transport line that is flexible by hand and without the use of tools and wherein the at least one flexible fluid transport line interconnects the at least one livestock treatment liquid containing container and the one or more livestock treatment liquid therein with the electromechanical pump and a nozzle, and wherein the electromechanical pump is in signal communication with a microcontroller; and wherein the nozzle is fluidly connected to the electromechanical pump via the at least one flexible fluid transport line. The microcontroller is typically contained within the waterproof junction box having a door and in wired or wireless electrical signal communication with at least each of the following: the electromechanical pump; and a dosing selection subsystem system chosen from: (1) a potentiometer within the waterproof junction box having a dose selection interface displayed to a user on an exterior surface of the waterproof junction box that is configured to be changed by the user by hand and without the use of tools such that the user may select a dose of the at least one livestock treatment liquid to be delivered through the nozzle and onto the upward-facing surface of a livestock and/or (2) a livestock scale comprising at least one load cell in wired or wireless communication with the microcontroller wherein the at least one load cell provides a signal to the microcontroller that identifies a weight of the livestock to be treated by the application subsystem and wherein the microcontroller calculates or identifies the dose of the livestock treatment liquid to be applied to the livestock.

Yet another aspect of the present disclosure is generally directed to a cattle treatment application system that includes an application subsystem that only applies one or more cattle treatment drug to an upward-facing surface of an animal where the application subsystem includes at least one cattle treatment drug containing container that is housing the one or more cattle treatment drug; and a first electromechanical pump within a junction box, wherein the first electromechanical pump is fluidly connected to the at least one cattle treatment drug containing container via at least one fluid transport line and wherein the at least one fluid transport line interconnects the at least cattle treatment drug containing container and the one or more cattle treatment drug therein with the first electromechanical pump and a first nozzle, and wherein the first electromechanical pump is in signal communication with a microcontroller; and wherein the first nozzle is fluidly connected to the first electromechanical pump via the at least one fluid transport line and positioned to dispense a first cattle treatment drug onto only the back of a cattle along a spine of the cattle or within ten inches from the spine of the cattle during use. The microcontroller may be contained within the junction box having a door and is typically in wired or wireless electrical signal communication with at least each of the following: the first electromechanical pump and a dosing selection subsystem. The dosing subsystem may be (1) a potentiometer within the junction box having a dose selection interface displayed to a user on an exterior surface of the junction box that is configured to be changed by the user by hand and without the use of tools such that the user may select a dose of the at least one cattle treatment drug to be delivered through the first nozzle and onto the back of the cattle and/or (2) a cattle scale comprising at least one load cell in wired or wireless communication with the microcontroller wherein the at least one load cell provides a signal to the microcontroller that identifies a weight of the cattle to be treated by the application subsystem and wherein the microcontroller calculates or identifies the dose of a cattle treatment liquid to be applied to the cattle.

Another aspect of the present disclosure is generally directed to the method of applying a drug or other animal treatment composition to the back of an animal by passing the animal underneath one or more treatment application systems described herein and applying treatment when the animal is properly positioned underneath a downwardly extending nozzle such that liquid treatment composition(s) are application to the animal at the proper time, in the proper location and in the proper dosage for a given condition or conditions being treated.

These and other aspects, objects, and features of the present invention will be understood and appreciated by those skilled in the art upon studying the following specification, claims, and appended drawings.

BRIEF DESCRIPTION OF THE DRAWINGS

In the drawings:

FIG. 23 is an exemplary recognized medicine listing screen where a series of medicines are shown along with their volume to weight ratio/recommended treatment dosage that should be applied according to an aspect of the present disclosure.

FIG. 24A shows the cow entering the tunnel. FIG. 24B shows the cow passing under the nozzle of the system and the nozzle activating. FIG. 24C shows the cow leaving the tunnel and a second cow entering the tunnel behind the first.

DETAILED DESCRIPTION OF EMBODIMENTS

Figure 1:
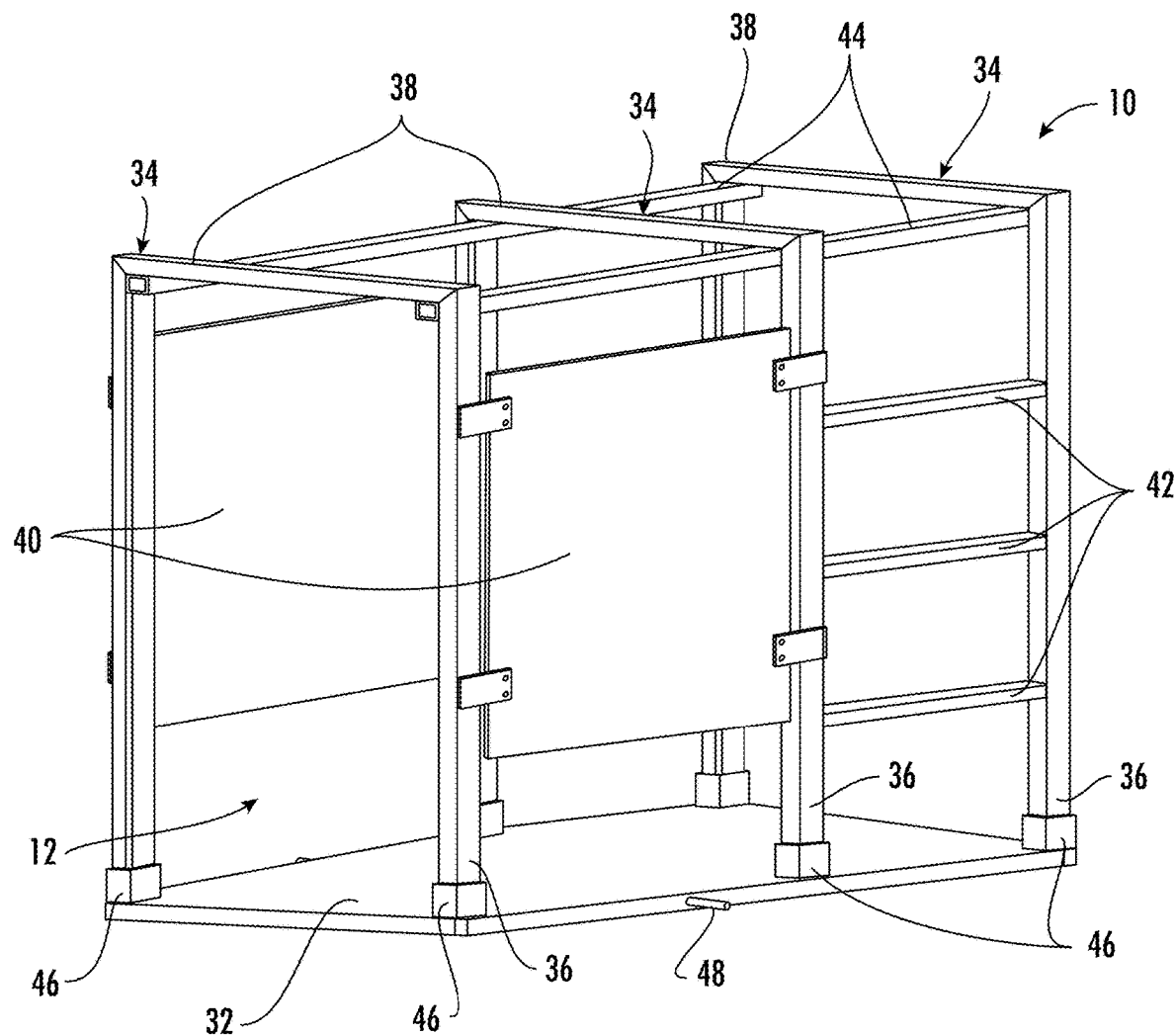
FIG. 1 is a perspective view of a livestock treatment application system according to an aspect of the present disclosure.

For purposes of description herein, the terms "upper," "lower," "right," "left," "rear," "front," "vertical," "horizontal," and derivatives thereof shall relate to the disclosure as oriented in FIG. 1. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Where a range of values is provided, it is understood that each intervening value, to the tenth of the unit of the lower limit unless the context clearly dictates otherwise, between the upper and lower limit of that range, and any other stated or intervening value in that stated range, is encompassed within the scope of the present disclosure. The upper and lower limits of these smaller ranges may independently be included in the smaller ranges, and are also encompassed within the scope of the present disclosure, subject to any specifically excluded limit in the stated range. Where the stated range includes one or both of the limits, ranges excluding either or both of those included limits are also included in the scope of the present disclosure.

It will be understood by one having ordinary skill in the art that construction of the described and claimed invention and other components is not limited to any specific material. Other exemplary embodiments of the disclosure herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the present disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

Figure 2:
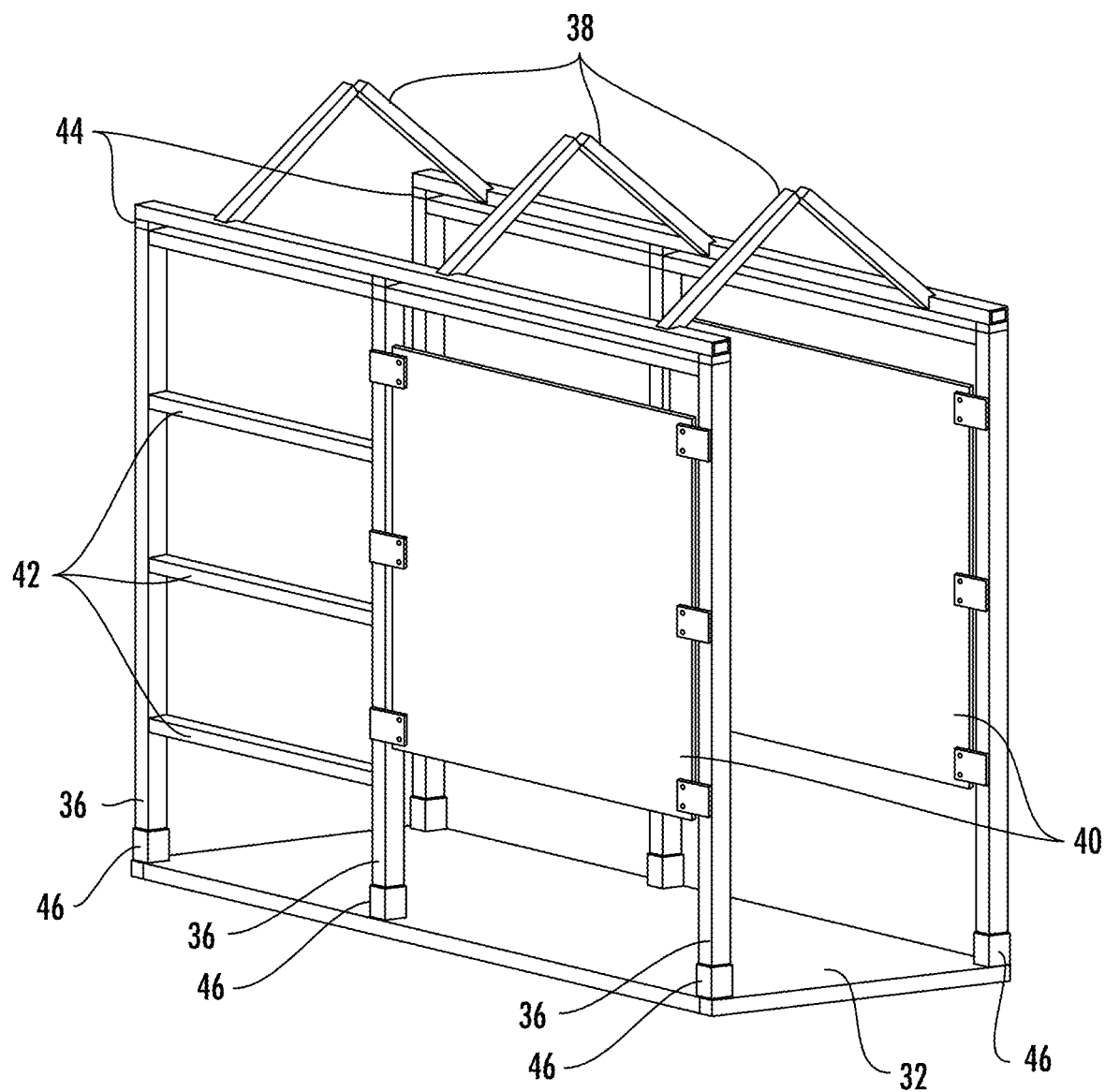
FIG. 2 is a perspective view of a livestock treatment application system according to another aspect of the present disclosure where the bars across the top of the frame are angled to provide added structural support as well as structural support for solar panels to be placed over the top of the system to provide power and shade over the processing area under the solar panels.
Figure 3:
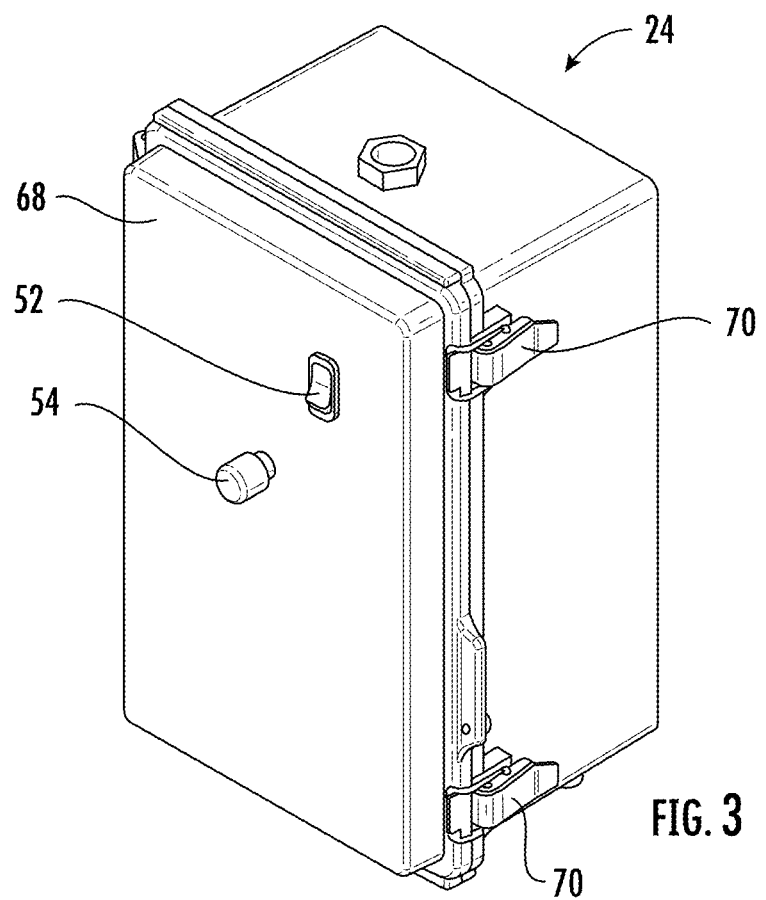
FIG. 3 is a front perspective view of a junction box, which may be water/liquid tight for housing many of the electrical components of the livestock treatment application system according to an aspect of the present disclosure.
Figure 4:
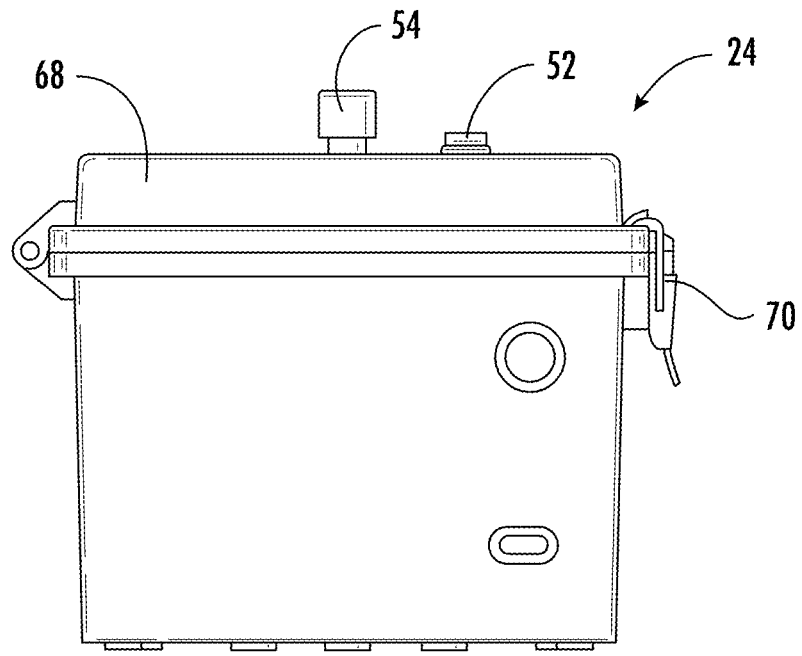
FIG. 4 is a bottom view of the junction box according to an aspect of the present disclosure.

FIGS. 1-2 show an animal treatment system 10. Typically, the animal treatment system is for four-legged mammals, more typically a ruminant (including but not limited to cattle, deer, sheep, goats, antelopes etc.), even more typically bovine or cattle. The system 10 even may be used to treat animals such as lamas, alpacas and horses as well as traditional ruminants. The systems of the present disclosure typically include a tunnel 12 that the animals, typically cattle or other livestock animals pass through and may be sized and constructed to operate to treat ruminants of any size; however, the drawings show and depict the system sized for the treatment of cattle. The systems also typically include a treatment storage container 14 to contain one livestock treatment chemicals or a plurality of livestock treatment chemicals, a microcontroller 15, a pump 16 and at least one nozzle 18, which is typically a downwardly extending nozzle to deliver and apply the treatment chemicals, nutrients and/or pesticide treatments to the outside of the animal, ruminant or other livestock as the animal travels under or within the field of application of the nozzle or nozzles. Conceivably a plurality of treatment storage containers may be used in connection with the systems of the present disclosure and those containers may contain concentrated or diluted forms of a single or a blend of treatment compositions, typically one medicine or nutrient or a plurality of medicines or nutrients. If a plurality of separate treatment storage containers are employed, separate hollow, typically flexible plastic, liquid feed lines may be used to draw the contents into one or more mixing chambers where the liquids may be blended or the feed lines may be connected to separate nozzles to separately apply treatment liquids, typically medicines or nutrients through a plurality of nozzles.

While one nozzle is shown in the figures of the present disclosure, a plurality of nozzles may also be used and may be positioned above at an angle that is not perpendicular to the ground or other surface that the ruminant is traveling upon. The plurality of nozzles may be used to apply treatment compositions at an angle to treat the top and the side (typically the upper portion of the side above the middle of the side of the animal/ruminant/cattle). However, the liquid treatments are typically applied along the spine of the animal in the area of the spine and the area immediately adjacent the spine of the animal, which is typically within about 6 inches, more typically within about 4 inches, most typically within about 3 inches at the time of application. The liquid treatment compositions would typically (depending on the viscosity and the amount of liquid applied) move away from the area of application and along the exterior of the animal due to the force of gravity.

Figure 5:
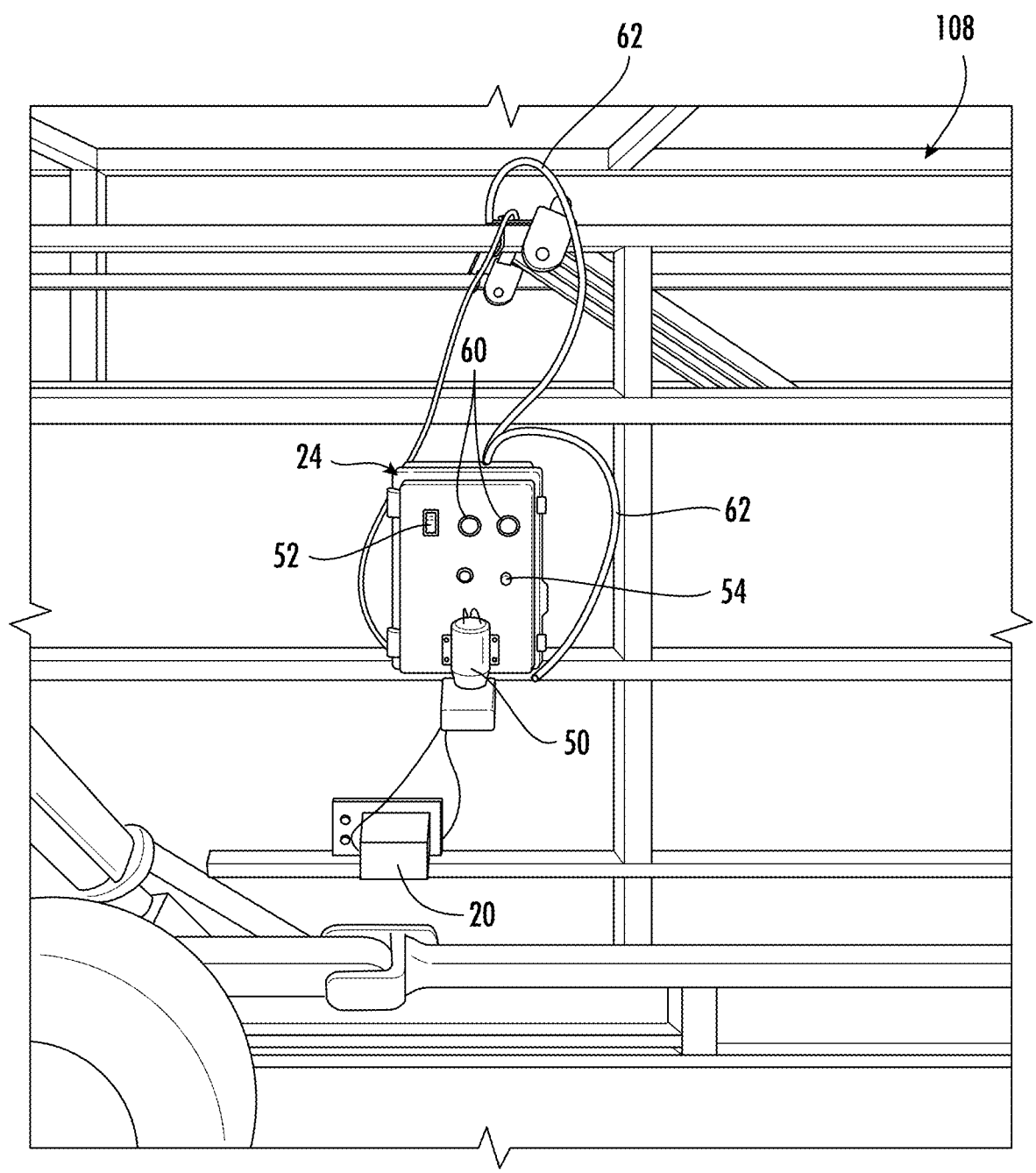
FIG. 5 is a front view of a livestock treatment application system according to an aspect of the present disclosure with a cattle detecting sensor retrofitted onto an existing cattle chute according to an aspect of the present disclosure.
Figure 6:
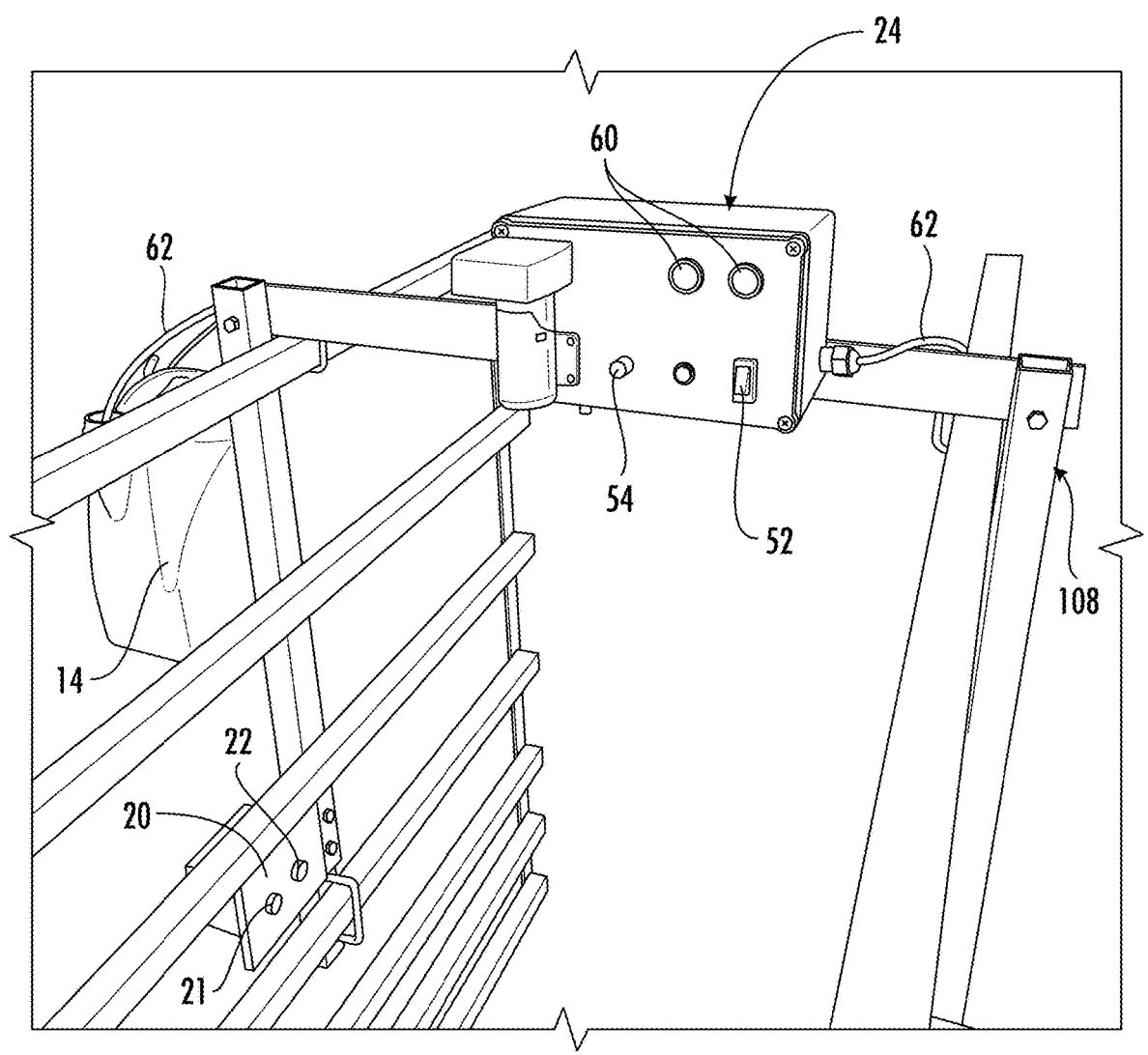
FIG. 6 is a perspective view of a livestock treatment application system with a cattle detecting sensor in an aspect of the present disclosure wherein the junction box is located above the cattle chute.
Figure 7:
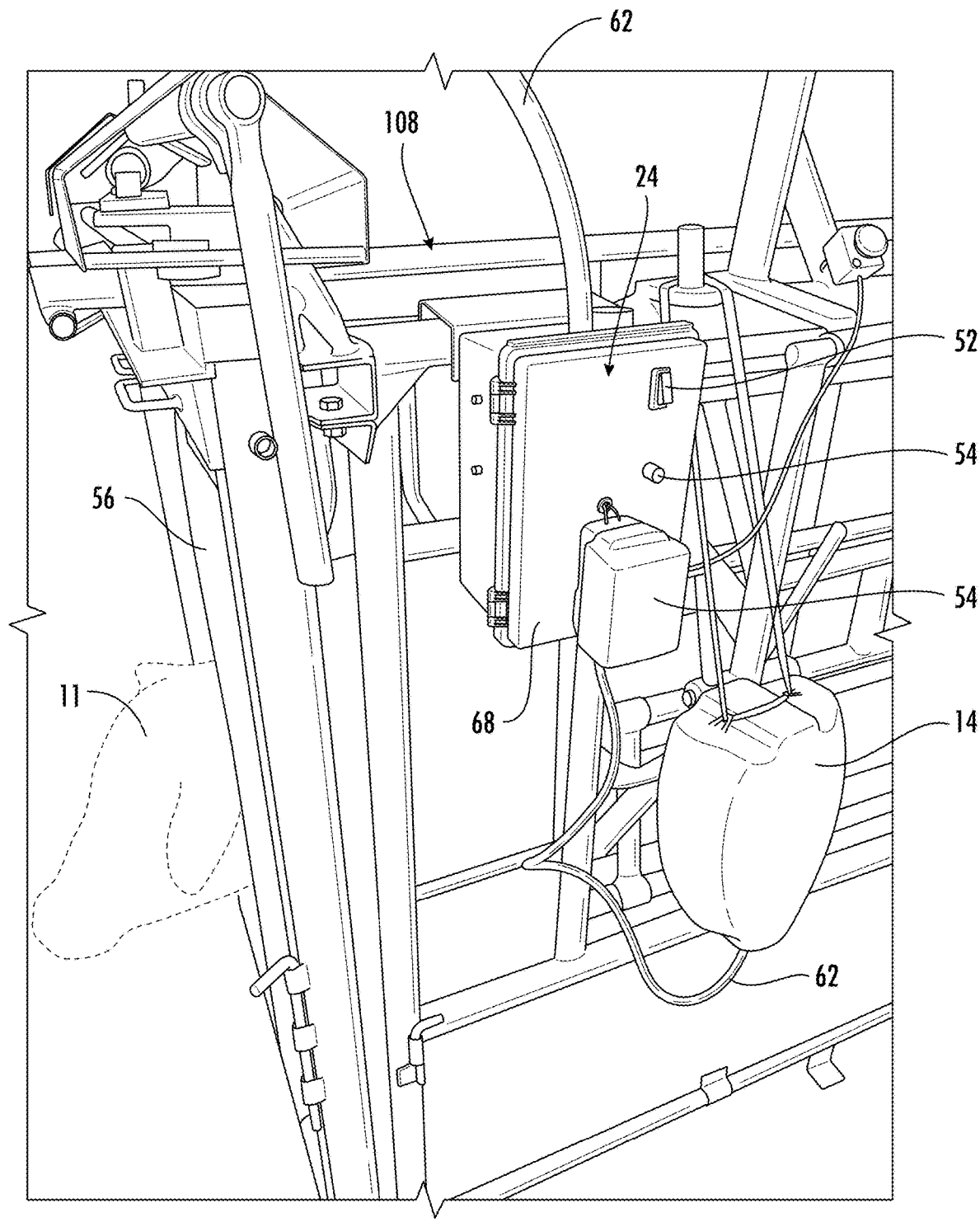
FIG. 7 is a perspective view of the livestock treatment application system retrofitted onto/into engagement with a cattle chute according to an aspect of the present disclosure. The system shown is typically activated by pressing a button.
Figure 8:
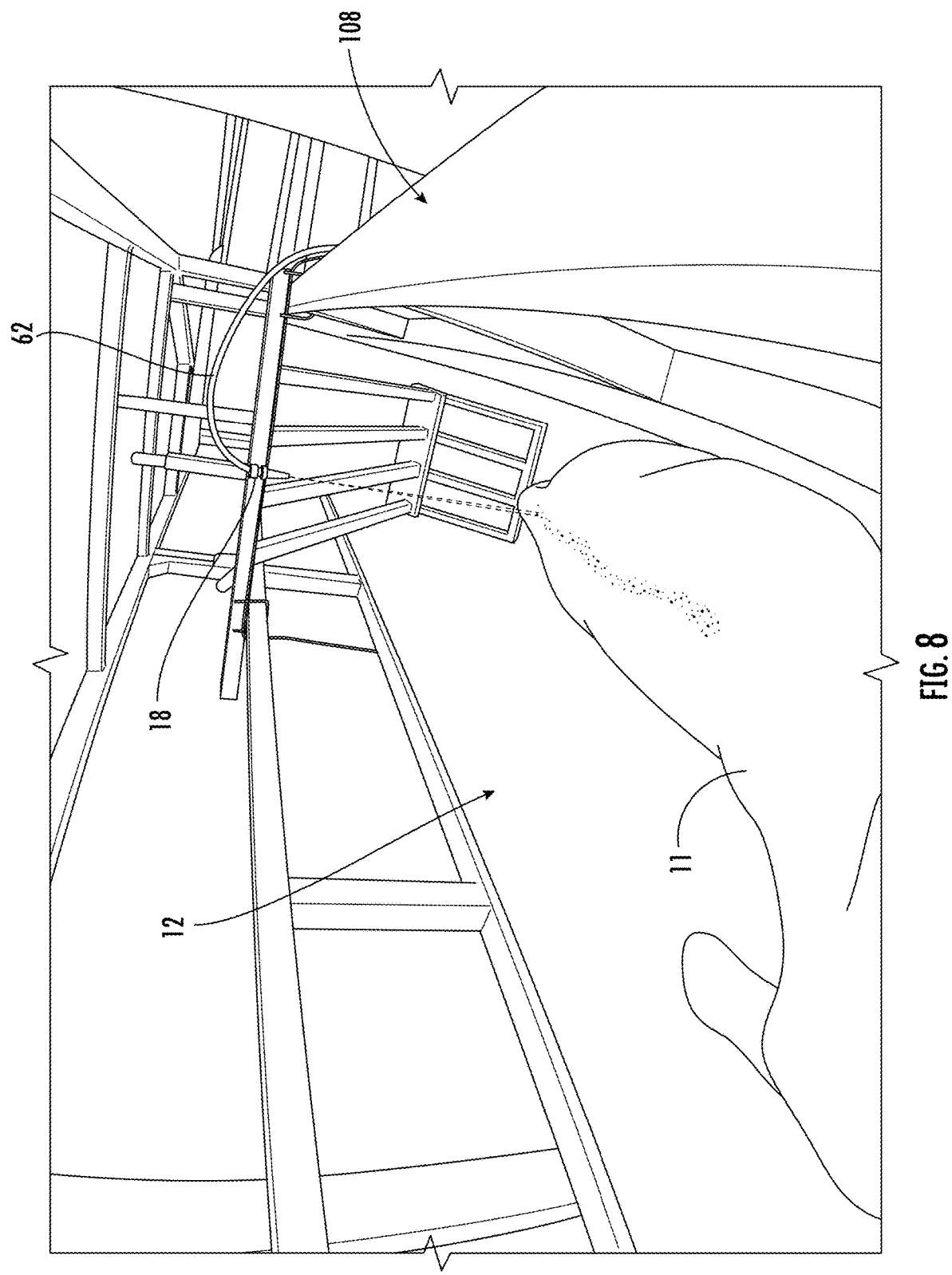
FIG. 8 is a view of a livestock, typically a cattle, within an existing cattle chute that has been retrofitted according to an aspect of the present disclosure. A nozzle of the system sprays and typically does not aspirate, but delivers a liquid stream or drip of livestock medicine onto the back of the livestock, typically only along the center spine and the portion immediately proximate the spine of the livestock.
Figure 9:
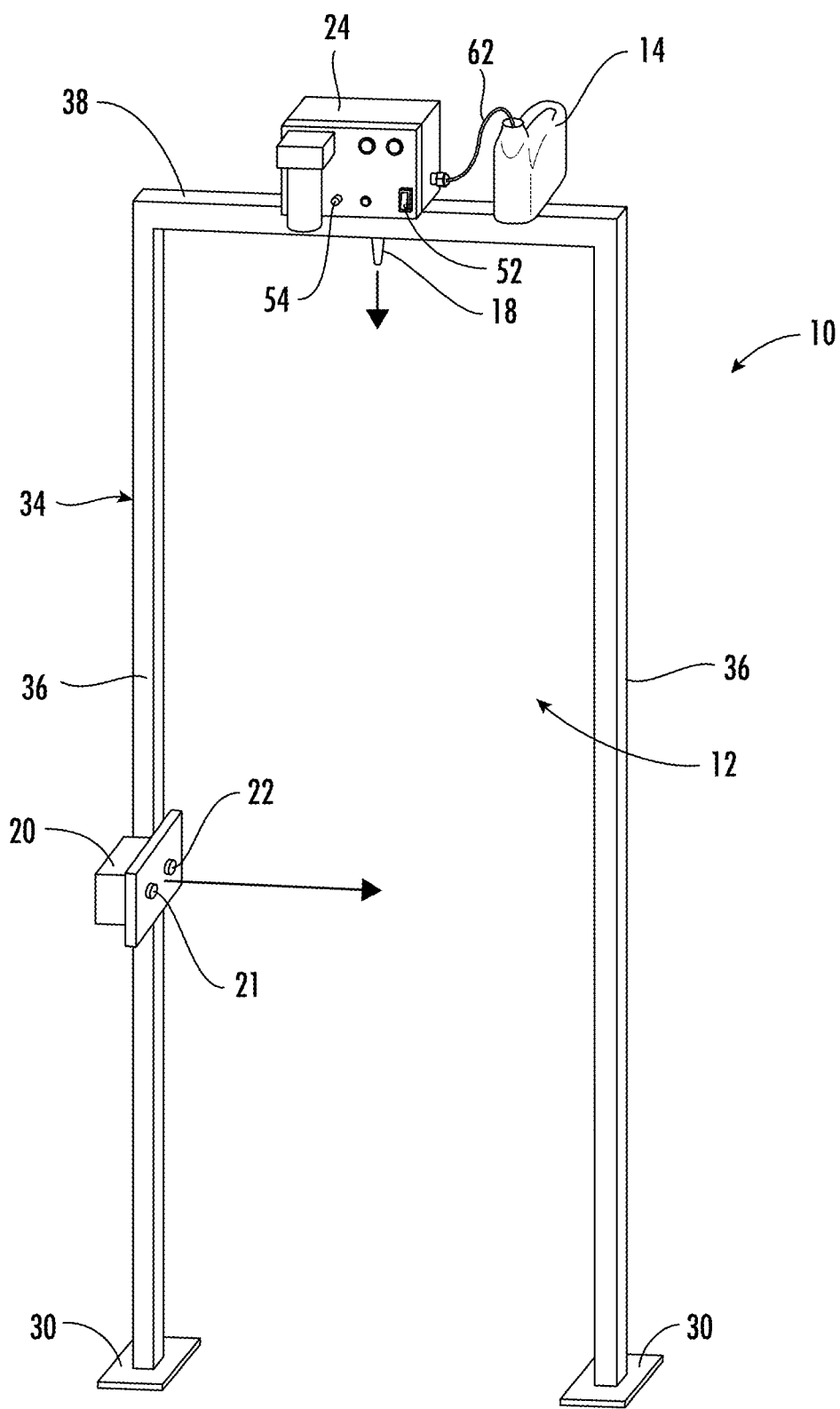
FIG. 9 is a front right perspective view of a livestock treatment application system that includes only a single arch according to an aspect of the present disclosure.

As shown in at least FIGS. 5, 6 and 9, a laser sensor system 20 that includes a laser emitter 21 and a laser detector 22 may be used so that a laser or other light system spans a gap within the tunnel between two side structural components, typically upwardly extending supports or side walls and detects the presence of a ruminant, typically a cow. The systems of the present disclosure also typically include an electrical component and other component containing junction box 24 that can hold some or all of the electrical components used by the system. The livestock treatment application system 10 may also optionally include a plurality of stabilizing plates 30, which do not span the distance between the upwardly extending parallel bars 36 or a singular large base plate 32 on the bottom of the livestock treatment spanning the distance between the upwardly extending parallel bars 36 application system 10 to keep it stable on the ground or other surface it is placed upon. These plates may be any shape but are typically rectangular or square and are affixed to the bars 36 that provide upward support and define a passageway through which the animals travel. The base plate may for an entire floor covering the entire bottom surface area of the system 10 as well.

As shown in at least FIGS. 1-2, the tunnel 12 through which the animals pass during use of systems of the present disclosure may include one or a plurality of arches 34 arranged in succession such that they form a straight passageway or chute for the passage of animal(s) to be treated. Each of the arches 34 are typically connected to and bridge over the tunnel 12 between two upwardly extending parallel bars 36 that are parallel with one another and typically perpendicular to the ground or the base plates 30 or the singular large base plate 32, along with a top bar 38 that reaches from a top end of a first upwardly extending parallel bar to a top end of a second upwardly extending parallel bar. Conceivably, the top bar 38 could be curvilinear and not extending in a straight line and parallel to the bottom surface of the system 10 as shown, but the top bar would typically be substantially parallel or parallel to the ground bridge spanning across and interconnecting the two upwardly extending parallel bars 36. The arches 34 are typically made of metal, but could be made out of wood or plastic such as a plastic (PVC) pipe. The tunnel 12 of the present disclosure is typically constructed of metal to be durable when encountering large ruminants that might otherwise break weaker material. However, it is typically made of metal for durability of use in connection with the animals passing through the systems and receiving treatment without damage. Furthermore, the components forming the arches 34 may be hollow metal bars such as steel square tubing. In this way, electrical wiring, plastic tubing, and other components can be routed through the steel square tubing to reach other areas of the tunnel 12 without being exposed to the elements or to livestock that may chew on or otherwise interfere with or damage the wiring or other components of the system 10 spaced within the steel square tubing for protection. A pair of plastic panels 40 may be disposed between two of the arches 34, and may be attached to the arches 34 by a plurality of brackets affixed using a fastener such as a screw or bolt. A first panel typically reaches from a first standing bar of a first arch to a first standing bar of a second arch opposite the first arch and a second panel reaches from a second standing bar of the first arch to a second standing bar of the second arch.

Beyond the second arch, there may be additional arches 34 further spanning the two sides of the tunnel and further defining the pathway of travel of an animal through the systems of the present disclosure. A third arch would be typically aligned with the first and second arches 34 as to continue the straight tunnel 12 formed by the first two arches 34, and would be substantially the same size and shape. This may be the same for any arches 34 past the third as well. Any number of arches may be used to form the tunnel 12 depending on the length of the tunnel desired. The arches 34 may be interconnected by horizontal side bars 42 that run from one standing bar to an adjacent standing bar. The horizontal side bars 42 help to support the tunnel 12, as well as prevent a livestock animal 11 from leaving out the sides of the tunnel 12 before the livestock animal 11 reaches the intended exit. These horizontal side bars 42 are typically disposed in between each space between arches 34 aside from the space between arches 34 occupied by the plastic panels 40. The junction box 24 can be conveniently positioned on any of the horizontal side bars 42, if not positioned somewhere else. The junction box is typically affixed to a bracket The tunnel 12 also typically includes a pair of top corner support bars 44. The top corner support bars 44 are typically horizontal, and span from the first arch in the tunnel 12 through all of the subsequent arches 34 until it meets the last arch and are typically affixed to each of the arches 34 of the system 10. The top corner support bars 44 are also typically attached within the corner between a standing bar and the top bar 38. The top corner support bars 44 are typically arranged perpendicularly with the top bars 36 and the standing bars 36.

The standing bars 36 are typically about 1%2 to 2%2 inches by about 3%2 to 4% inches in diameter, more typically about 2 inches to about 4 inches in diameter. The horizontal side bars 42 are typically about 1% to 2%2 inches by about 1% to 2%2 inches, and are more typically about 2 inches by about 2 inches in dimension. The top corner support bars 44 are also typically about 1%2 to 2%2 inches by about 1%2 to 2%2 inches in cross-sectional dimensions, more typically about 2 inches by about 2 inches.

As can be seen in FIG. 2, the systems of the present disclosure may be formed of walls on each side and arches formed by bars 38 extending upward to create a peaked system as discussed above, which supports a roof that may be formed from traditional coverings and roof materials or cloth to create shading or from solar panels that have a dual purpose of providing shading and a surface from which to apply treatments as well as for providing power to the system, especially when the system is used remote from any traditional electrical power source such as a municipal power source.

In certain use cases, such as in a cattle pasture, the ground may be uneven. If the livestock treatment application system 10 is not added as part of an existing chute that is built into a particular area, the livestock treatment application system 10 may be prone to tipping over. This is exacerbated by animals, which can be very heavy, passing through the livestock treatment application system 10 or otherwise rocking it or even playing with it. To keep the livestock treatment application system 10 stable, the livestock treatment application system 10 may include a plurality of stabilizing plates 30 (See FIG. 9) as discussed above, or a singular large support plate 32. The stabilizing plates 30 are typically flat, and may be any shape that helps evenly distribute the weight of the livestock treatment application system 10. The stabilizing plates 30 are located on the bottom of the standing bars 36, operating essentially as feet. The stabilizing plates 30 may be adjustable, so that an individual standing bar can be raised higher in a location that the livestock treatment application system 10 is listing at or if the standing bar is located over an area that is higher or lower than the ground on which the other stabilizing plates 30 are positioned. The stabilizing plates 30 or the singular large stabilizing plate 32, when employed may be anchored into the ground using metal anchors that pass through one or more drilled apertures within the stabilizing plates 30 or the singular large stabilizing plate 32. The anchors would typically extend at least a plurality of inches into the ground and may be inserted using a hammer or other force application tool and removed by hand and without the use or tools or using a prying tool to apply extra leverage and force to remove the anchor from engagement with the ground.

When used, a single large support plate 32 acts as a large base for the livestock treatment application system 10. It is typically a singular, unitary piece of metal, and is typically substantially flat and free of any manmade divots or groove or cavities, which makes even the base easier to clean after use with a power washing or water generally. Of course, a plurality of single large support plates 32 could conceivably be used at different locations along the tunnel 12. A plurality of attachment brackets 46 may be located along a top side of a large support plate. The attachment brackets 46 are typically permanently attached to the plate using a weld or potentially removably engaged using fasteners to the plate. More typically the attachment brackets would be welded to the metal of the base plate and be constructed of metal as well. The attachment brackets 46 are typically hollow and sized to matingly engage the standing bars 36 with a friction fit engagement between the two components. The plurality of attachment brackets 46 typically corresponds to the number and arrangement of the standing bars 36, and the standing bars 36 are inserted into the attachment brackets 46 and optionally a fastener such as a bolt used to further retain the bar in an engaged position with the bracket 66. For example, the standing bars 36 may be secured with metal bolts. To increase portability, the large support plate may include outwardly extending pins 48 along its sides. The outwardly extending pins 48 provide an easy way to attach cables, hooks, or chains, and can be used to move the livestock treatment application system 10 as a unitary system from one livestock location to another either between farming locations and within the same farm. The large support plate may further include wheels, typically positioned at the corners of the system 10, to further increase its portability. The outwardly extending pins 48 are typically made of steel, and are about one inch long. If the system includes more than one base plate, outwardly extending pins 48 may be present on each plate system to facilitate stable movement of the systems when movement of the overall system is desired.

In some embodiments, the systems of the present disclosure are retrofitted onto an existing cattle chute. This system provides greater flexibility to move the system between existing tunnel or chute systems already present on the farm or livestock processing location. When a retrofitted and mobile system is employed, a user does not need to purchase an entirely new system including the tunnel, but instead only needs to attach the junction box and medicine fluid transport lines to a convenient and accessible location on one of their own currently existing cattle chutes the regulate the flow and location of the livestock at the farming location where the livestock are located. The junction box and its components are shown in FIGS. 3-7. The systems within the junction box control the application of treatment chemicals onto the exterior surface (hide/fur/skin) of the livestock. In particular, the junction box includes a pump that delivers the treatment liquid, typically medicinal chemicals and/or nutrients, to a livestock animal present within the tunnel and in a treatment location. The pump is or pumps are fluidly connected to one liquid storage container or a plurality of liquid storage containers and a corresponding spraying nozzle(s) via one or more fluid lines. The fluid lines are typically plastic tubing, more typically flexible plastic tubing, but could conceivably have a portion or all of the fluid line be rigid. The flexible plastic tubing may be clear as well to allow the user to see the progress of the delivery of the liquid through the flexible tubing during use.

The junction box typically includes a microcontroller that is electrical communication with a motor driver module and receives signals from the laser detector indicating whether a livestock animal has entered or left the tunnel based upon when the laser detector and sensor are no longer connected with one another. The pump is driven by a motor, which is in turn controlled by the microcontroller. The junction box also typically includes a battery 50, which may be alkaline or rechargeable battery, to power the pump, receiver, a switch 52 to activate the box, a potentiometer 54 to control the pump output, or any other electrical component within the junction box. The potentiometer 54 allows the user of the dispensing system of the present disclosure to accurately dose the amount of liquid being applied to the back of the animal for treatment. The potentiometer would typically set the amount of liquid to be delivered at mL increments between 0 and 60 ml such that the system delivers exactly or about (within 5-10%) of the amount of liquid dose selected at the potentiometer dial of the system of the present disclosure. The battery 50 may be attached to junction box either on the inside or the outside. Alternatively, the systems within the junction box could also conceivably be powered from an alternating current power source outside the junction box. As such, the systems within the junction box may receive electrical power externally from, for example, an electrical cable that connects the box to an outlet and/or the solar power source of the system when utilized. As the animal treatment application system is primarily meant to operate outdoors, possibly in a pasture or as a junction between two pastures without access to an electrical source, batteries or on-site power generation is typically used and generally preferred.

In some aspects of the systems of the present disclosure, livestock are not detected using a laser or other livestock detection system. There can be no laser detection of cattle within the cattle chute. Instead, a squeeze chute may be used with a head locking mechanism that keeps the cattle in a stationary position within the chute so treatment may be applied. A head lock 56 is operated by a human user who can determine if the cow is in the optimal position, or it may be automated. In this case, once the livestock, typically cattle, has been secured in the head lock, a human operator can press an activation button 55 or lever on the exterior facing surface of the junction box or a separate activation button that is distal from the junction box, but wired into the junction box. The activation button 58 causes the microcontroller to run the pump and deliver an amount of medicine onto the livestock's back. The amount delivered is automatically calculated from the weight of the animal and the designated volume to weight ratio of the medicine to be used. The weight is obtained from a scale or load cells attached to the chute and in communication with the microcontroller. It is also possible that the pump will only ever deliver a predetermined amount, regardless of the weight of the livestock. Alternatively, the junction box may automatically run the pump when the livestock has been secured by the head lock within the chute. The required amount of treatment chemicals is provided from the nozzle onto the livestock's back, and once it is finished, the livestock may be released from the head lock.

Cattle chutes used in connection with the applicator systems of the present disclosure may have an associated scale in wired or wireless signal connection with the applicator systems and the systems of the junction box of the present disclosure. The scale and the associated load cells of the scale typically used to just measure the weight of the livestock on the scale may be also used to detect the presence or absence of a given livestock or possibly even the location of the livestock within the tunnel of the overall system or within a livestock/cattle chute. As such, the systems of the present disclosure may use the load cells or the readout from the scale to measure the weight of the livestock and/or detect the presence of the livestock at the location of the scale within the chute. The scale typically contains load cells on the underside of the scale surface below the chute. The weight of the livestock is recorded by the scale and may be used by the system of the present disclosure to determine the amount of medicine or other nutrients that should be dripped or otherwise delivered typically in a liquid stream onto the livestock to appropriately dose and precisely locate the administration of the one or more liquid livestock pharmaceutical or nutrient(s) such as vitamin and mineral supplements. Medicine and other liquid livestock treatment compositions for treating or preventing one or more disease(s) or conditions of the livestock is usually applied in an amount relating to the weight of the livestock similar to the manner in which many drugs are provided to humans. The scale is typically in wired or wireless signal communication with the microcontroller of the junction box. The communication may be wireless, such as through BLUETOOTH™ or WIFI®. Alternatively, the scale would be directly wired to microcontroller.

Figure 10:
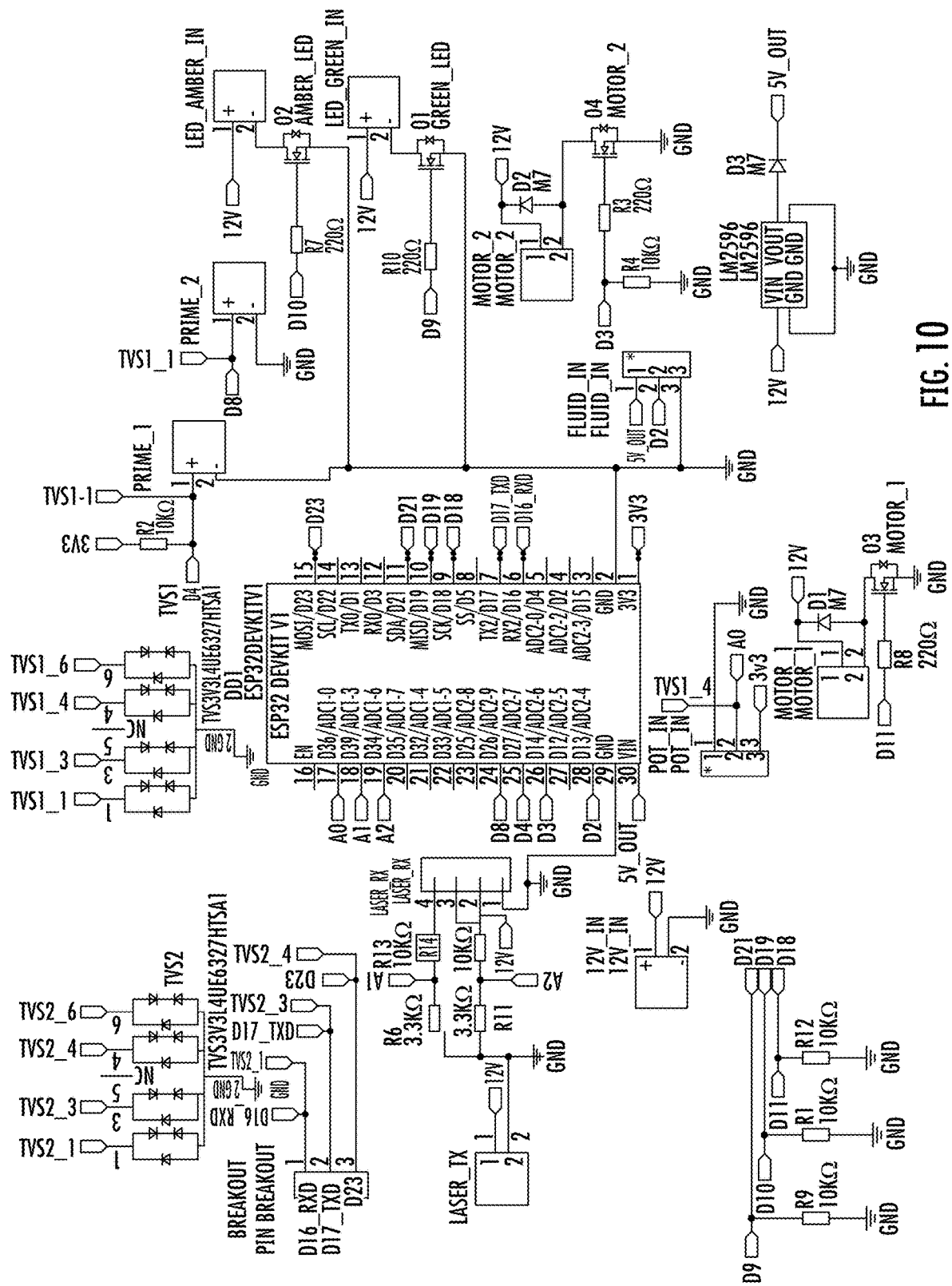
FIG. 10 is a schematic diagram of the electrical circuitry within the junction box according to an aspect of the present disclosure.
Figure 11:
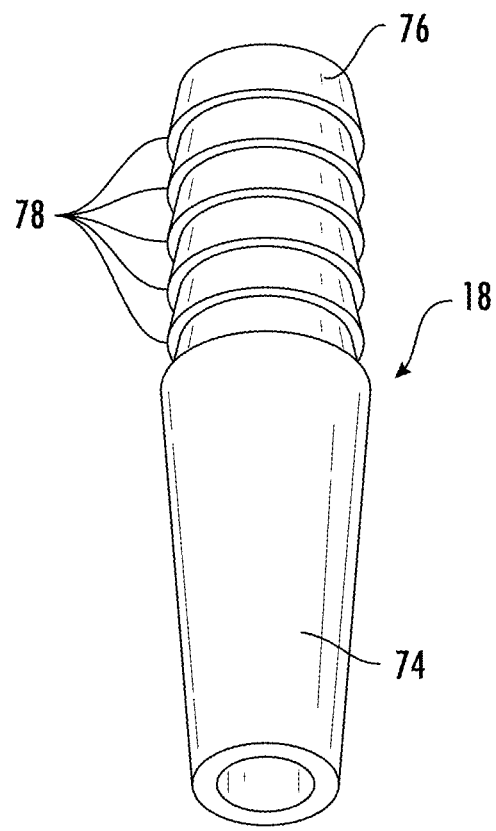
FIG. 11 is a lower perspective view of a nozzle used to apply medicine to the exterior surface of the livestock according to an aspect of the present disclosure.

FIG. 10 shows an exemplary diagram of the electrical circuit of the livestock treatment application system. The circuit typically includes a microcontroller, a motor, a variable resistor, and a motor driver module. The circuit also often includes two photocells in parallel attached to a battery, a laser (light) emitter, and a laser (light) detector. The laser (light) detector is in electrical communication with the microcontroller. The microcontroller and the motor driver module control the motor, and the motor operates the pump. As shown in the exemplary diagram of the electrical circuit, more than one motor may be connected and regulated using the system. Similarly, while not shown, the system may be interconnected with and control a mixing system to blend a plurality of treatment liquids as discussed herein. The system is typically programmed to apply treatment liquid(s) when the light emitter of the livestock detection system, typically a laser system, is not in signal connection with the detector. The junction box may also include and on and off switch and lights 60 on its outside surface that indicate whether or not the device is turned on or if it is currently dispensing treatment chemicals. There may be more than one light, and each light may be differently colored. In a potential embodiment, the lights are green and orange, although hey may be any color. The lights may be light emitting diode (LED) lights, fluorescent lights, incandescent lights or any other kinds of light bulb.

The medicine transport lines 62 may include one or more sensors 64 for monitoring the presence and/or the flow of fluid and/or the rate of the flow of fluid. Typically, at least two sensors are employed in a spaced apart relationship from one another. A sensor is preferably attached to the fluid transport line adjacent to the junction box, such that the sensor can monitor fluid entering the junction box and the pump. Another sensor is typically attached near the nozzle, such that it can ensure that the nozzle is receiving medicine and communicate the status to the controller within the junction box. The sensors may be optical sensors, vibration sensors, ultrasonic sensors, or any other type of sensor, although they are typically ultrasonic sensors.

The junction box may be located anywhere on the tunnel that does not inhibit the pump or fluid lines in any way, although it is most preferably located on a side of the systems of the present disclosure attached to the horizontal side bars. The junction box may also be connected to the framework of the systems of the present disclosure only by the fluid lines and be otherwise entirely disconnected from the system. The junction box may also be located on top of the systems of the present disclosure as shown in FIGS. 6 and 9, usually attached to a horizontal top bar. In situations where a cattle producer has their own alleyway or chute to route cattle or other animals, the junction box may be attached wherever is convenient to the existing chute/animal pathway. In FIG. 9, this is shown to be on top of the arch. The junction box may be attached to the alleyway or chute or other mounting location using a metal mounting bracket that may be temporarily affixed to the alleyway or chute or permanently affixed thereto such that the junction box can be removable be engaged and disengaged with the mounting bracket by hand and without the use of tools thus making the junction box and system transferable to another location and back to the same mounting bracket with ease. Of course, the system could be affixed to the mounting bracket such that the junction box is not removeable by hand and without the use of tools, but instead in a manner that requires tools to disengage the junction box.

Other components of the livestock treatment application system may be attached to the existing chute as well so that they, and the junction box, can function properly. Different orientations of the junction box are possible too, of course. As shown in FIG. 6, the junction box may be rotated to allow for better connections of the fluid lines. The junction box operates independent of the orientation of the junction box in space. As discussed, the junction box is typically connected to the cattle chute or other cattle or livestock processing location using one or more bracket. The bracket 66 may be removably attached to the junction box or it may be permanently affixed by fasteners or possibly welded onto the junction box or the chute or other metal livestock tunnel or livestock processing system. The junction box typically will include a lid or door portion 68 that a user may open to access the interior of the junction box. The door portion is typically connected to the junction box via hinges, and may optionally have locking clamps 70 to keep the door closed. The door typically creates a liquid tight seal to keep fluid from outside the junction box from entering the interior of the junction box and potentially damaging the electrical and other systems within the interior volume of the junction box.

Additionally, the animal treatment application system may include more than one junction box. With multiple junction boxes, more electrical components can be included. A livestock treatment application system may include redundant components, such as multiple pumps (that typically independently have a motor), within the junction boxes in case one component fails or breaks. This way, the livestock treatment application system can continue to treat livestock continuously despite a mechanical breakdown occurring in the system. Normally, if the animal treatment application system breaks down, treatment of the livestock will halt until the issue is resolved, leading to a waste of time, resources, and potentially hurt profit. This will also prevent a situation where multiple livestock pass through the tunnel before an error or breakdown of the system is detected, causing the livestock to accidentally go without treatment and potentially have to be redirected through the system after repair or manually have treatment applied to the livestock. Multiple systems providing treatment liquids to an animal may also be employed to provide a two-stage (or multi-stage) treatment or two separate applications of the same treatment as the animal passes through the systems of the present disclosure. For example, an animal may be treated with an amount of a first treatment liquid and then a second treatment liquid may be applied after traversing a distance through the system and triggering another dose of the same treatment liquid or a dose of a second treatment liquid through the breaking of a second light sensor system at a second location to provide a second dosage. This might allow for broader applications of different treatments or different treatment amounts based on the weight, for example, of a given livestock as it proceeds through the entirety of the systems of the present disclosure.

It is also possible, that a first stage of the system might use a light detection system or other signal activation system such as the load cells of one or more weight scales as discussed herein that can sense the location of an animal at a first location before any treatment chemicals are applied to cause water to clean the animal's surface that is about to be treated with the treatment liquid(s) prior to doing so. In this case, the surface of the animal may be prepared for treatment such as by spraying the surface of the animal with water prior to application of the one or more treatment liquids being applied and/or physically conditioning the surface of the animal by application of air or perhaps combing or brushing of the hide prior to application of the one or more liquid treatment compositions. This may result in the treatment liquids being more effective and healthier for the animal and/or faster and safer uptake of the medicine or other nutrients being administered transdermally to the livestock animal.

Figure 12:
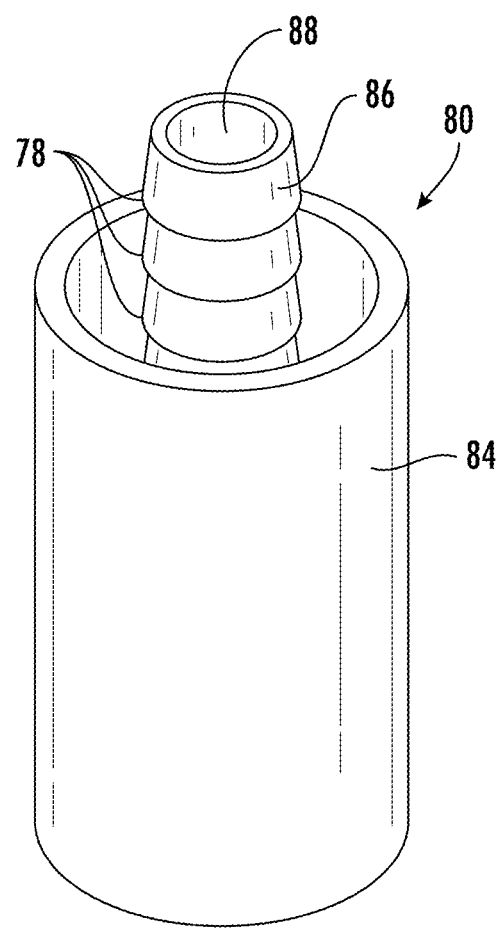
FIG. 12 is an upper perspective view of a nozzle adaptor surrounding the according to an aspect of the present disclosure.
Figure 13:
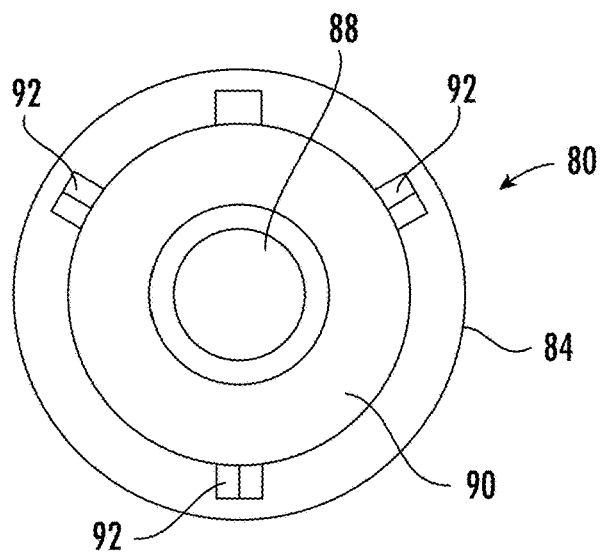
FIG. 13 is a bottom view of the nozzle adaptor shown in FIG. 12 according to an aspect of the present disclosure.
Figure 14A:
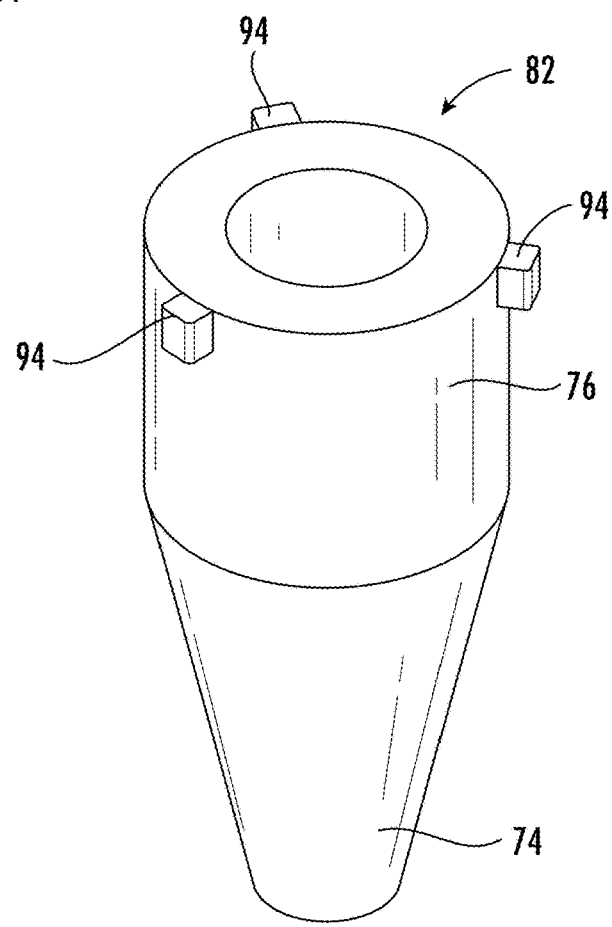
FIG. 14A is a perspective view of a nozzle that may be attached to the nozzle adaptor of FIG. 13 to provide a liquid tight seal. The nozzle shown may be attached and detached by hand and without the use of tools according to an aspect of the present disclosure.
Figure 14B:
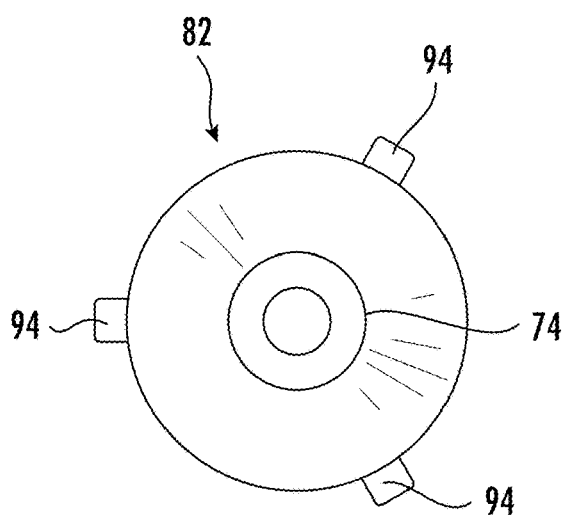
FIG. 14B is a bottom view of the nozzle that may be attached to the nozzle adaptor of FIG. 13 according to an aspect of the present disclosure.

The nozzle 18 (FIG. 12) of the present disclosure is generally cylindrical, but tapers to create a narrow end 74 and a wide end 76. The wide end has a plurality of barbs 78 that provide a frictional engagement to the medicine transport lines. Typically, the nozzle 18 is inserted into an end of the line. Alternatively, the nozzle may instead be a nozzle adaptor 80 used in conjunction with an adaptable nozzle 82, as in FIGS. 12-13. The nozzle adaptor has a cylindrical main body 84. The nozzle adaptor has a barbed medicine transport engaging portion 86 that extends upward from the main body and is inserted into the medicine transport line. An internal channel 88 runs from the barbed medicine transport line engaging portion 86 and into the main body, wherein it meets an enlarged nozzle engaging cavity 90. The nozzle engaging cavity has a series of locking channels 92. An adaptable nozzle typically has a narrow end for the release of medicine and a wide end that fits into the nozzle adaptor. The wide end also has a plurality of projections 94 that extend radially from the wide end. The projections fit into the locking channels of the nozzle engaging cavity. The locking channels have a vertical portion and a perpendicular horizontal portion, forming an L-shape. The attached the adaptable nozzle FIGS. 14A-B) to the nozzle adaptor by first inserting the adaptable nozzle into the nozzle adaptor and aligning the projections with the locking channels. The projections move up the vertical portion until they reach the horizontal portion, whereupon the nozzle is twisted. The projections move along the horizontal portion, and prevent the nozzle from moving up or down. The user may remove the adaptable nozzle by twisting the nozzle back and pulling it out. The nozzle adaptor allows the user to easily switch out different nozzles depending on the animal or medicine to be applied. A user would switch out the nozzle with one that has a wider opening if the medicine to be applied is viscous enough. This is useful for thicker, oil-based medicines, such as CLEAN-UP II™, which is a pour on insecticide containing about 3% by weight diflubenzuron and 5.0% by weight permethrin with the balance of the composition being other ingredients. Alternatively, narrow nozzles are better for applying less viscous, alcohol-based medicines like INVERMECTIN™. The chemicals used to treat animals can treat sucking lice, chewing lice, house flies, stable flies, horse flies, black flies, horn flies, deer flies, and cattle ticks on animals including, but not limited to, lactating and non-lactating dairy cattle, beef cattle, calves, mature horses, and foals.

Figure 15:
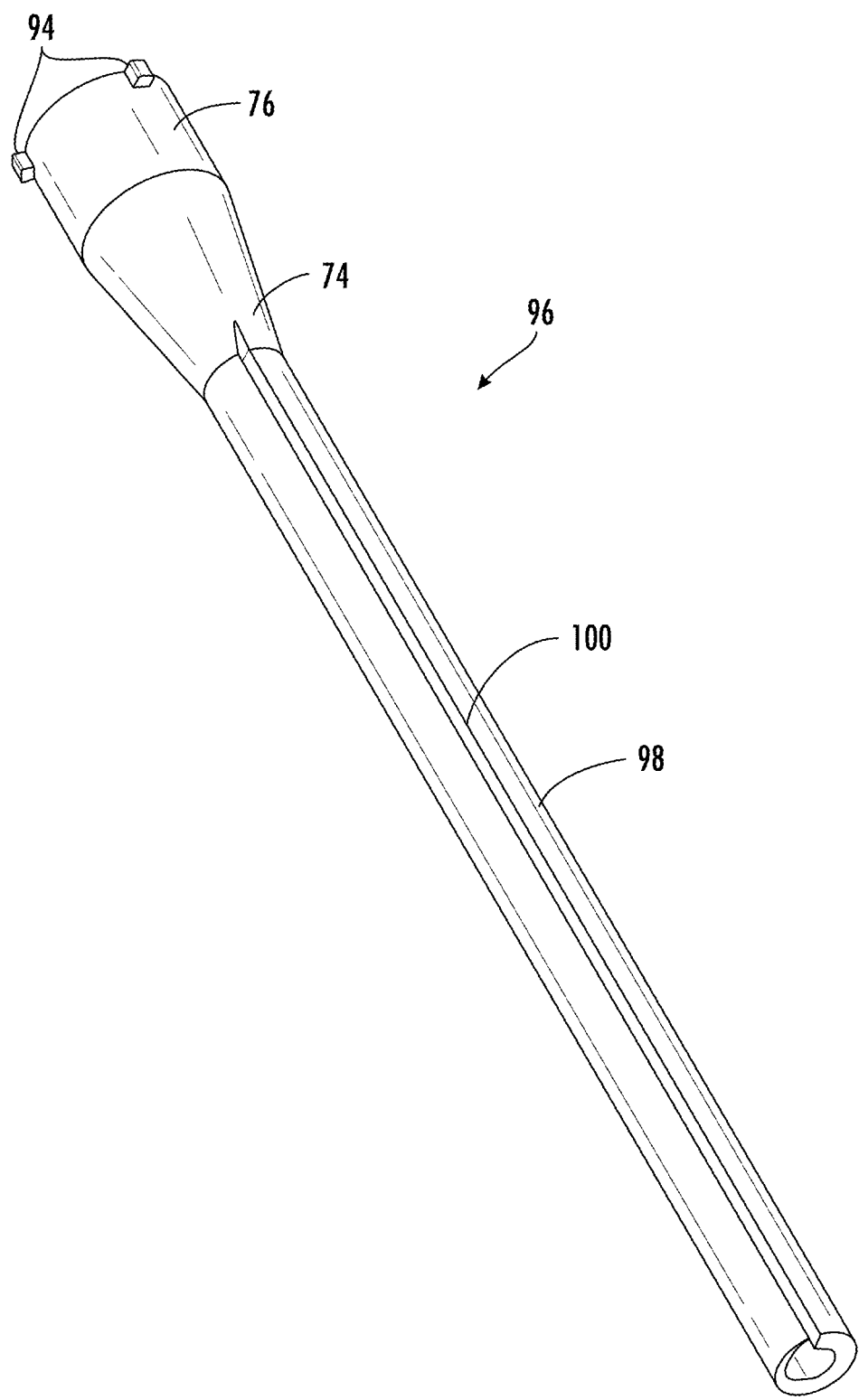
FIG. 15 is a nozzle with an elongated nozzle member with a cut running lengthwise along the elongated nozzle member to that cattle medicine exits the nozzle as a curtain according to an aspect of the present disclosure. The nozzle is adapted to engage with the nozzle adaptor. The nozzle in use is typically oriented horizontally and in alignment with the spine and/or the area immediate adjacent the spine of the cattle during application of medicine through the applicator to provide a more gentle and typically an application that extends along a greater portion of the length of the spine of the livestock or cattle in contract to other applicator nozzles that may only apply to a spot along the area of the spine or proximate the spine of the cattle if the nozzle is not activated as the livestock moves, but only after the livestock is in a fixed position. The configuration shown applies across a greater length of the animal when the animal is not moving forward or backward during application.
Figure 16:
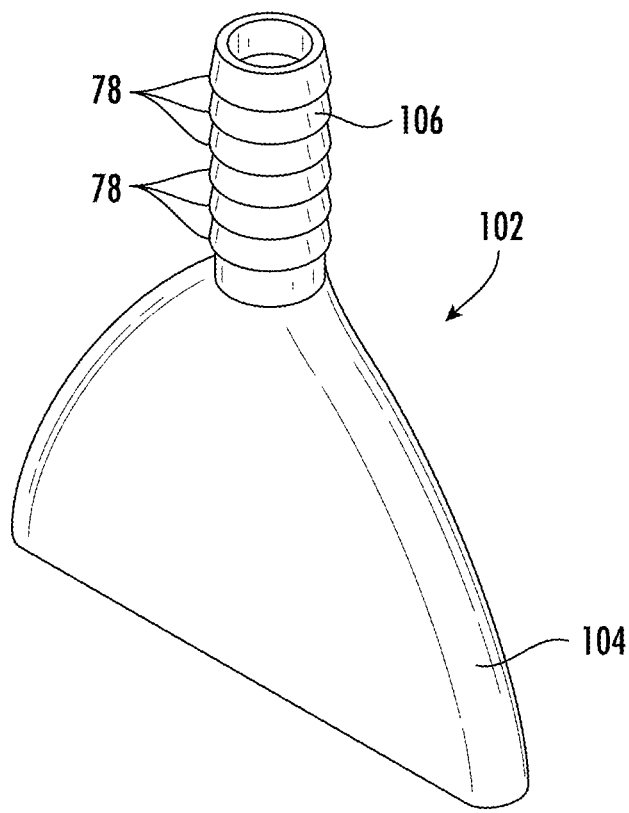
FIG. 16 is a nozzle that can be attached to the main line of the system or if present without the ridges into engagement with the adapter, and has an enlarged end for wider applications along the spine and the area along the spine according to an aspect of the present disclosure. This wider nozzle is also advantageous for thicker and more viscous medicines during application.
Figure 17:
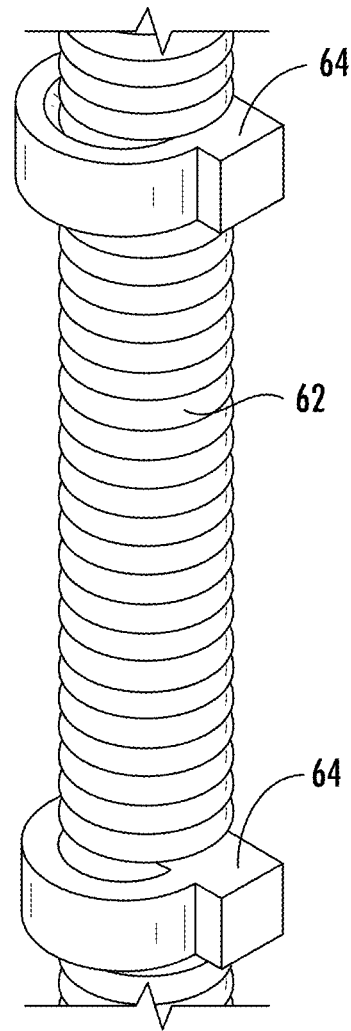
FIG. 17 is a perspective view of a portion of a medicine fluid transport hose that extends between at least a portion of the medicine flow path from the source and the nozzle with one or a plurality of sensors positioned circumferentially around all or a portion of the circumference of the hose where the sensors are for detecting the flow of fluid attached to the hose according to an aspect of the present disclosure.

FIG. 15 shows an adaptable nozzle that is an elongated adaptable nozzle 96. The narrow end of the elongated adaptable nozzle has an elongated tube 98 that extends from the narrow end. The elongated tube also has a cut 100 that runs long the entirety of its length. The elongated adaptable nozzle would be held horizontally, and aligned with the direction of the livestock below. The medicine flows along the elongated tube and out of the cut, creating a waterfall like flow or curtain. This is gentler than a high-powered stream, and it prevents any undesirable dripping of excess medicine. FIG. 16 shows a wide nozzle 102 having an enlarged end 104, as discussed earlier, this nozzle is better suited for thicker, more viscous medicines. The nozzle of FIG. 16 includes a barbed end 106 to be inserted into the medicine transport line, although it could instead be adapted to fit into the nozzle adaptor.

The treatment storage container 14 may be a variety of sizes depending on the use and amount of treatment needed. The treatment compositions of the present disclosure typically include medicinal components and/or nutraceutical(s) such as vitamins and minerals, but is most typically an antiparasitic drug for the treatment of parasites infecting ruminants such as cattle. The antiparasitic drugs most typically used in connection with the treatment systems of the present disclosure include, for example, INVERMECTIN®. Other drugs useful in the context of the systems of the present disclosure include, but are not limited to, antiprotozoals, antihelminthics, anticestodes, antitrematodes, and antifungals—typically such medications are those that can be administered to animals topically and be effective. Typical containers, sold containing treatment chemicals such as INVERMECTIN®, commonly come in 1L to 5L variants.

Ivermectin is a semi-synthetic antiparasitic medication derived from avermectins, a class of highly-active broad-spectrum antiparasitic agents isolated from the fermentation products of *Streptomyces avermitilis*. Ivermectin itself is a mixture of two avermectins, comprising about 90% 5-O-demethyl-22,23-dihydroavermectin $A_{1a}$ (22,23-dihydroavermectin $B_{1a}$) and about 10% 5-O-demethyl-25-de(1-methylpropyl)-22,23-dihydro-25-(1-methylethyl) avermectin $A_{1a}$ (22,23-dihydroavermectin $B_{1b}$). The size of the container may be larger or smaller. The animal (typically cattle) treatment application systems of the present disclosure may be able to accommodate multiple treatment storage containers so that when one runs out of treatment, the pump can simply pull from a different container and continue treatment without interruption. If multiple types of treatment liquids (typically chemicals) are required, the treatment application system could come with multiple treatment storage containers, each holding a different treatment chemical. The livestock treatment application system may come with multiple pumps and nozzles to deliver/dispense each treatment chemical individually, or there may be a switching valve or control valve to regulate which treatment chemical is being pumped. The treatment may be controlled by the user with a software application that is linked with the system.

The tunnel typically includes one or more laser light sensor systems that span the distance between the two parallel standing bars of an arch. The laser light sensor system(s) used in connection with the present application typically include an emitter to create a laser or other light beam and a detector to receive the laser or other light beam and determine whether the beam is active. The detector and emitter may be located on opposite parallel standing bars, with the beam crossing from the emitter over the gap between the standing bars to the detector. Alternatively, the laser light sensor may only be both an emitter and detector, which emits a beam that reflects back and is detected by the detector.

In a theoretical embodiment, the emitter and detector may be on the same standing bar with a reflector on the opposite parallel standing bar, such that the emitter emits a beam across to the reflector, wherein the beam is reflected back over the gap to the detector. In particular, when a cow or other livestock animal 11 enters the tunnel, it will block the path of the laser beam, stopping the beam from reaching the detector. When this occurs, a signal will be sent to the microcontroller, which will cause the microcontroller 15 to communicate with the pump 16 to activate the pump 16 and deliver/apply the treatment liquid to the animal, typically in a dosed amount specific for the type and size of animal being treated. The one or more lasers are typically located on the livestock treatment application system 10 at a height around the chest height or higher of the livestock that is intended to use the animal treatment application system 10. The laser systems should be placed a minimum height of 24 inches off the ground (or the same surface the animal is walking on), but is typically placed about from 28 to 30 inches above the ground/above the surface the animal is walking. Typically, adult cattle have a shoulder, or withers, height of from about 50 inches to about 60 inches tall. Calves have an average shoulder height of 32 inches one month after birth. The laser typically should not be higher than the shoulder of the typical livestock. If the laser is located lower, only the livestock's legs will break the laser, which will lead to inaccurate and misleading signals sent to the junction box 24. A rear leg passing by a laser may indicate to the system 10 that a new livestock has entered the tunnel 12, when in fact the original livestock has not left the tunnel 12. This leads to wasted treatment. As a result, the laser system 10 should always be appropriately located such that the torso of the animal is passing across the path of the laser system or other animal presence detection system when the system employs a light source to signal the presence or absence of an animal at a given location in the system. Of course, more than one animal presence detection system such as a laser detection system can be used at the same or different locations within the overall treatment systems of the present disclosure. The detection systems may be a separate module of the system of the present disclosure that operatively connect to the junction box to provide the necessary detection signal to the dispensing portion of the overall system while enabling portability of the detection system as well as the dispensing portion of the overall system to allow greater ability of the overall system to be retrofit to existing cattle processing and control pathways/tunnels.

Figure 24A:
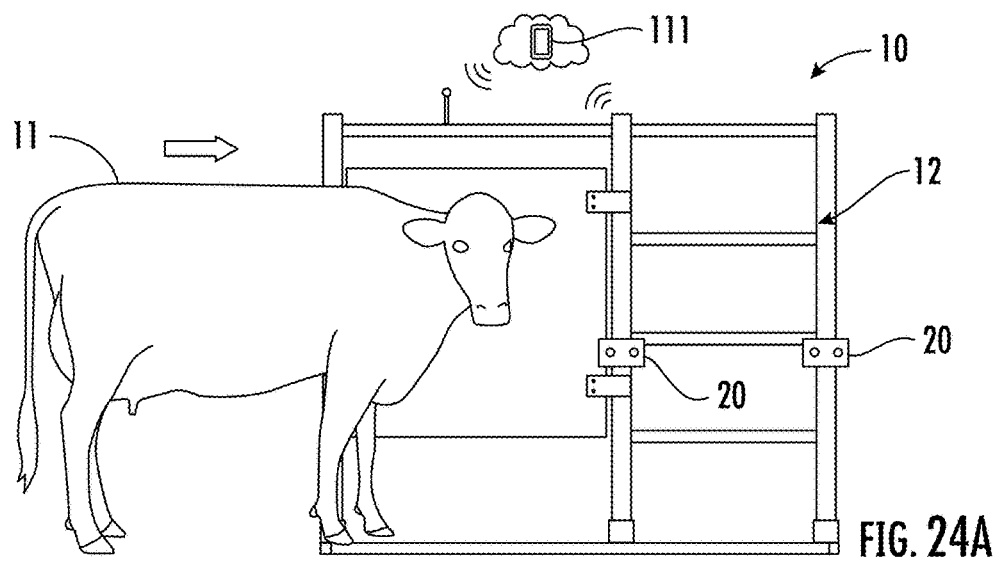
FIGS. 24A-C are a series of schematic views of a livestock passing through a tunnel such as shown in FIG. 1 to which the system of the present disclosure is attached.
Figure 24B:
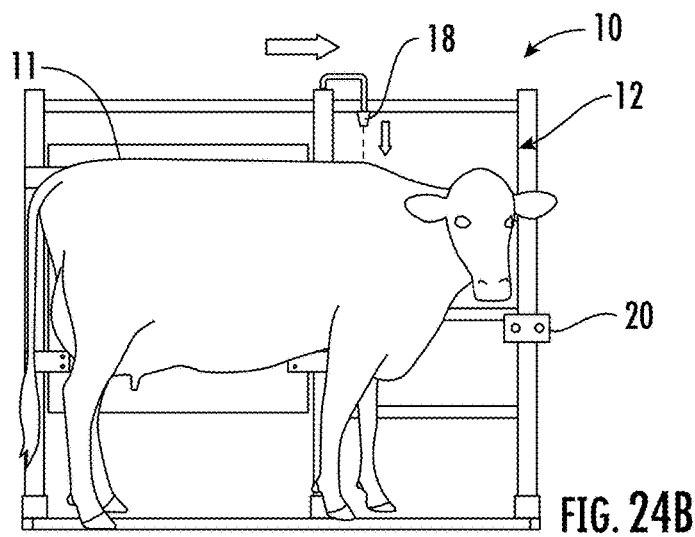
Figure 24C:
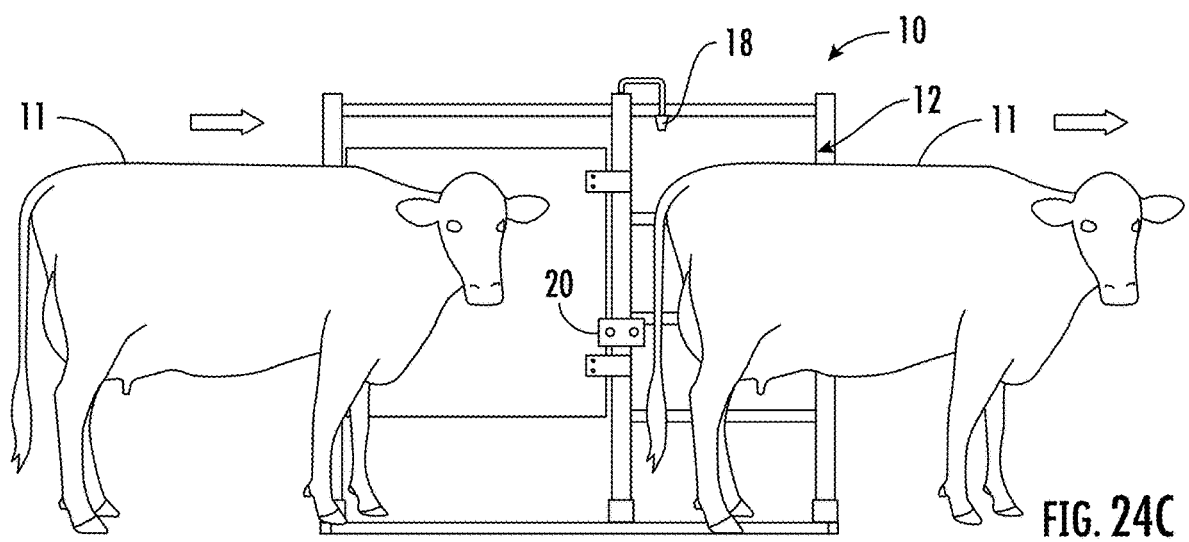

FIGS. 24A-C show the exemplary embodiment of the livestock treatment application system 10 using three arches 34 and three lasers while in use. First, a livestock animal 11 is urged into the tunnel 12 formed by the livestock treatment application system 10. In this case, the livestock is a cow, but it may be another animal. The laser detector or other animal presence detection system or device will send a signal to the microcontroller that an animal, typically a cattle, has entered the tunnel when the laser beam is broken. While this occurs, the cow continues its path down the tunnel. When the cow reaches and breaks the second laser, the cow will be in position to receive its prescribed treatment. If treatment is necessary, the pump will be activated to pull treatment from the treatment storage container and deliver it to the nozzle. The nozzle, which is typically a ⅝ inch round nozzle similar to ones used in coolant hoses should be in place above the cow, and treatment chemicals will be delivered, typically in liquid form, from the nozzle 18 to the cattle's back. The cow moving continuously down the tunnel will allow the treatment chemical to be applied evenly along the cattle's back. When the cow reaches and breaks the third laser, indicating that the cow is exiting the system, the pump is disengaged. To prevent any excess dosage, the pump will not be able to reengage until the laser is reestablished, indicating the animal has fully left the tunnel. This process repeats when a new animal enters the tunnel and breaks the first laser anew.

The animal treatment application system may also be designed to attach to an existing alleyway or squeeze chute 108 owned by a cattle producer. The systems in this case may be retrofit onto the current pathway system for animal control and typically only includes a junction box, a laser detection system, one or a plurality of liquid storage containers, and associated electrical wiring and treatment delivery plastic tubing connected to one or a plurality of nozzles. The existing alleyway or squeeze chute could theoretically be only a single arch-like structure, doorway, or gate. The junction box is preferably located on top of the existing alleyway or squeeze chute, although it may be anywhere that does not hinder its ability to regulate and pump the treatment liquid. The nozzle is typically located at the top of the existing alleyway or squeeze chute oriented downwards toward the back of an animal that is passing through the existing alleyway or squeeze chute to precisely deliver the treatment fluid to the area of the surface of the animal to be treated, typically on or proximate the spine of the animal passing through the existing alleyway or squeeze chute. The laser, optical sensor, light sensor, LIDAR sensor or other visual animal detection system, depending on the existing alleyway or squeeze chute, is typically located on the existing alleyway or chute at a level around the height of the animal's chest to be treated and can be adjusted based on the species of animal being treated and/or the age or size of the animal being treated.

In the case that the livestock treatment application system uses only a single laser and a single arch-like structure as in FIG. 9, the pump changes how and when it activates and deactivates. When an animal enters a tunnel formed by alleyway or squeeze chute, it breaks the laser beam. The presence of the animal is signaled to the junction box, which will then initialize the pump. In this case, the pump is set to apply a desired dosage of treatment according to a user inputted setting. The user inputted setting is typically set via a dial located on the animal treatment application system reachable by a human user, although it may be inputted in other ways as well such as a touchscreen interface. Once the pump is initialized, it will transport treatment from the liquid treatment container along the plastic tubing to the nozzle. The treatment will be delivered from the nozzle downward onto the back of the animal. The continuous motion of the animal allows the dosage to be applied evenly along the animal's back. The pump will disengage once either a predetermined amount of treatment chemicals has been delivered, or a predetermined time has elapsed. The pump will not be able to be reengaged until the laser is reestablished, indicating that the livestock animal has left the tunnel and that the livestock treatment application system is ready to accept a new livestock animal 11 for treatment. This prevents the overuse and waste of the treatment. Once the animal leaves the tunnel, a new animal can enter the tunnel. After the new animal breaks the laser, the pump is reengaged and the cycle restarts.

The livestock treatment application system may further include a software application 110 in signal communication with a wireless or wired connection with the junction box of the systems of the present disclosure. The software application 110 allows a user to monitor and control the system from a user operated computing device 111. The user operated computing device 111 is typically a mobile device, such as a smart phone, tablet, or laptop computer, but is not limited to purely mobile devices.

Figure 18:
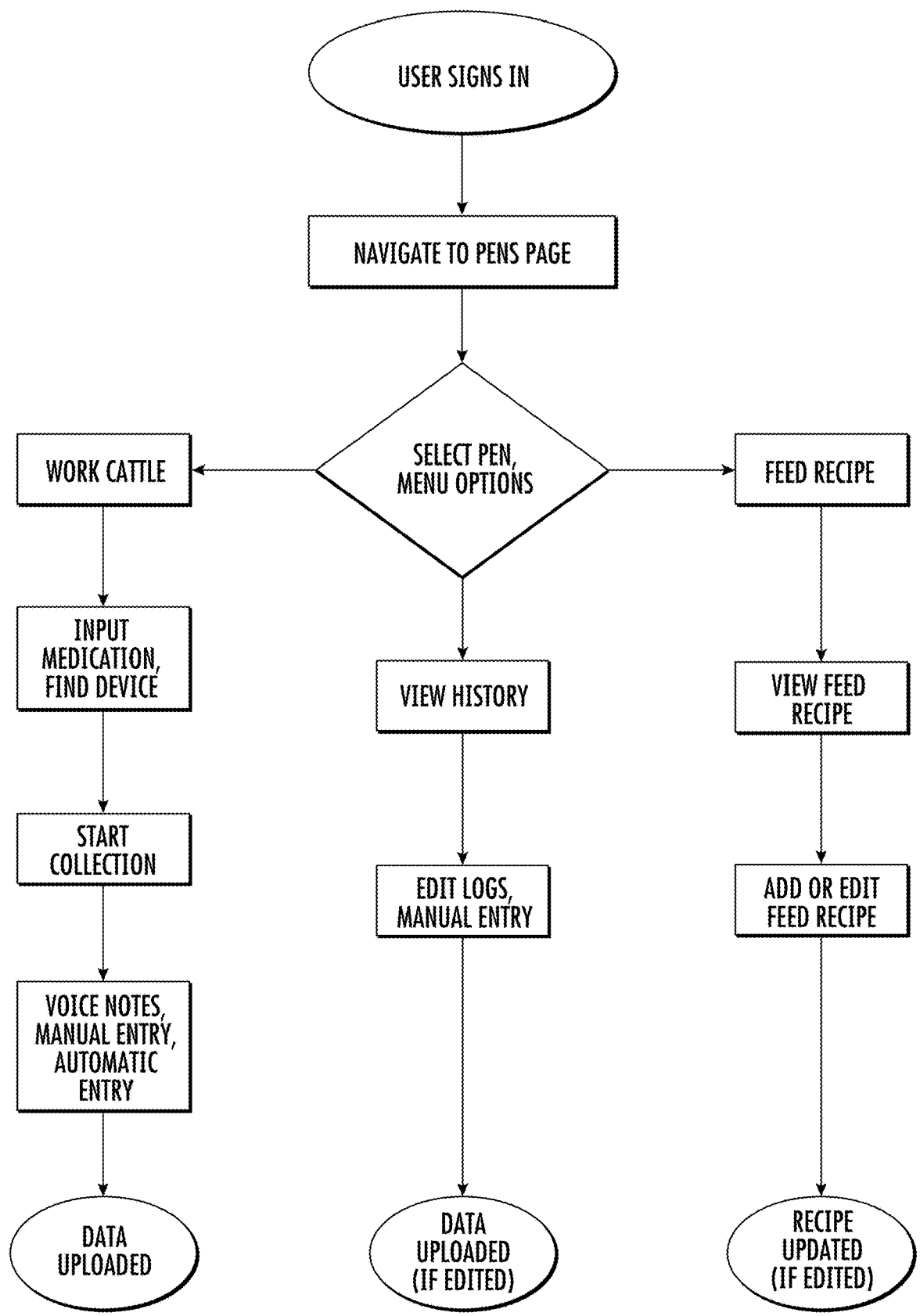
FIG. 18 is a process flow diagram of the software application according to an aspect of the present disclosure.
Figure 20:
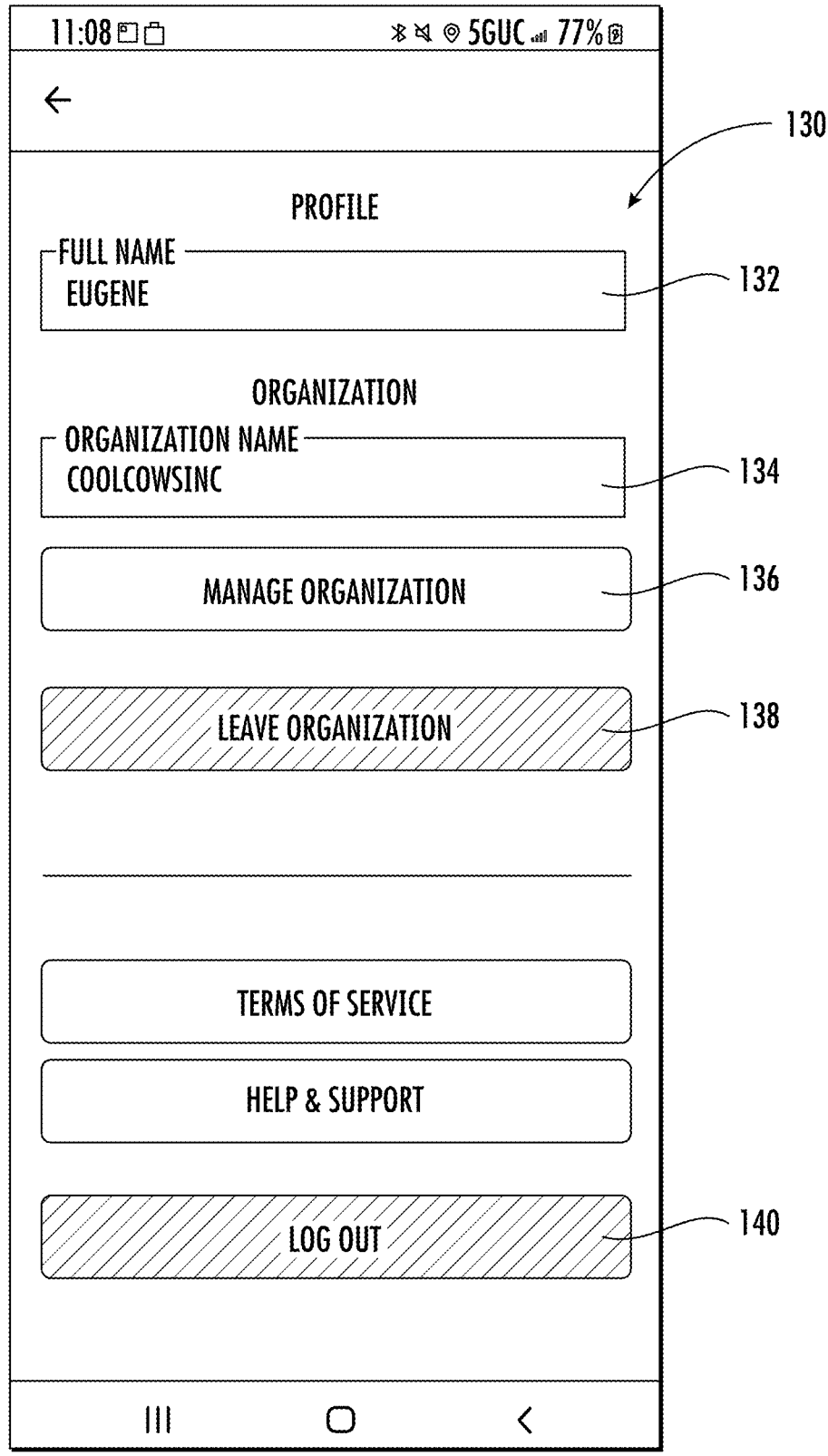
FIG. 20 is an exemplary profile screen according to an aspect of the present disclosure.
Figure 21:
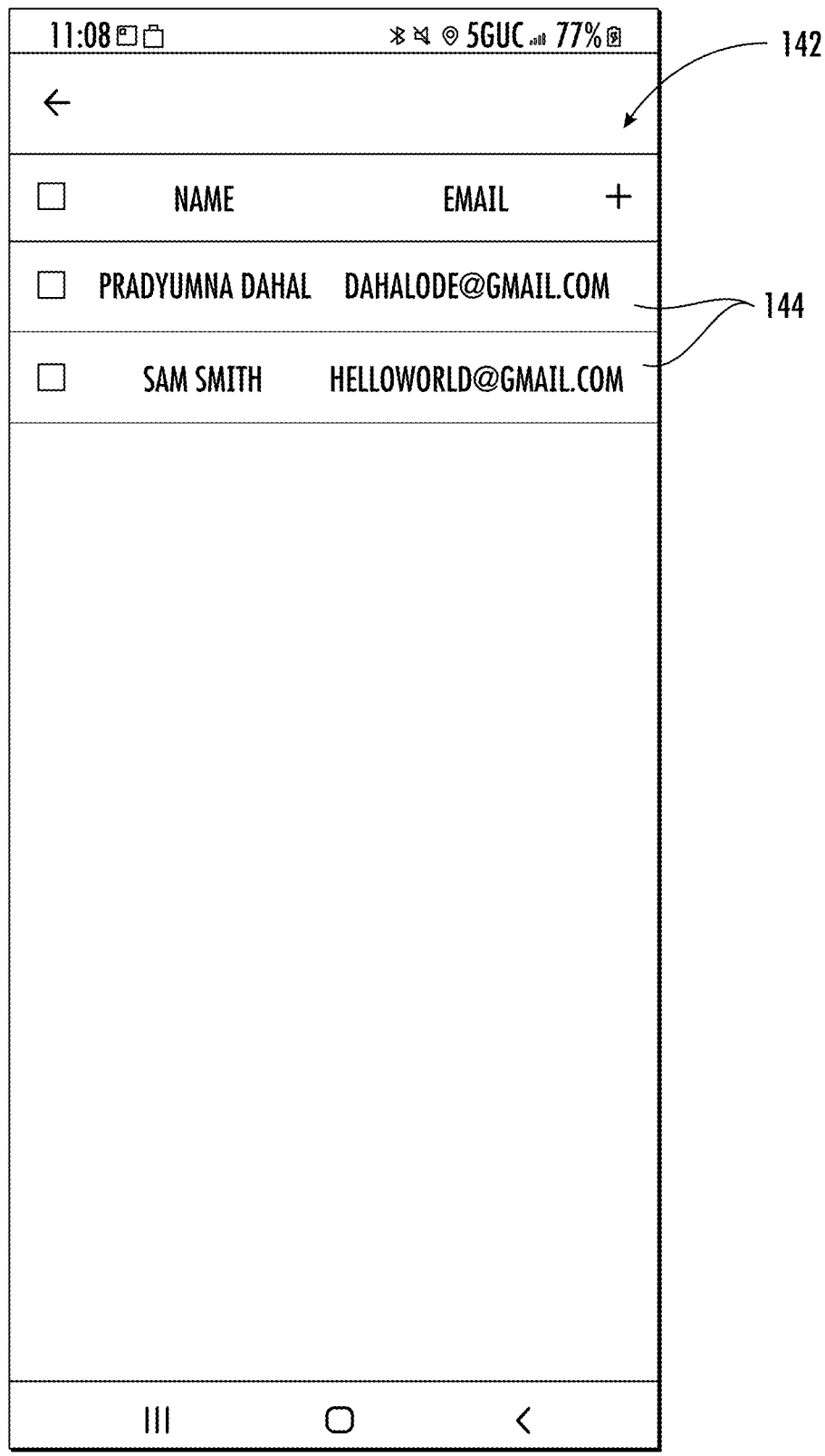
FIG. 21 is an exemplary access screen displaying the user who have access to a farming organization and pens according to an aspect of the present disclosure.

FIG. 18 shows the process flow for the software application. The software application is linked to the junction box of the system. The junction box may communicate with the software application via the internet or WIFI®, or a cellular radio network. The system of the present disclosure may be integrated into an internet of things (IOT) with the software application and user-operated computing device. The software application may be stored directly on the user-controlled computing device or it may instead be hosted on an external server that may be accessed by the user via web portal that may be reached with an internet browser. The user would log into the web portal using a username and password, or other identifying code. Data collected or inputted into the software application is uploaded to an external database. The data in the database may be edited by the user of the software application. Users will access to particular pens based on what pens 118 they or their organization owns. The software application includes a profile screen 130 (FIG. 20) and an organization access screen 142 (FIG. 21) showing accounts and what accounts belong to an organization. Through the profile screen, a user 132 who owns/runs the organization 134 may manage their organization using a manage organization link 136. They may add or remove other members (FIG. 21), or they may even leave the organization themselves using a leave organization link 138. Users may log out with a log out link 140, whereupon the user will need to log back in to use the system. In the Organization management screen, the user may view a listing of approved users 144, as well as add and remove approved users, which can include farm operators, farm hands, owners, and/or other professionals such as veterinarians tasked with treating the animals using the systems of the present disclosure. The veterinarians can also adjust and recommend changes in dosages of treatments and conceivable receive photographic diagnostic pictures of the animal from users on site with the animal to be treated to adjust the treatment dosage in essentially real time even though the veterinarian is located geographically remote from the animal and not able to observe the animal's condition personally without the use of the application and photographs and other information provide to him/her via the application. The system may also provide alerts to users automatically and/or based on user input to send an alert to one or more other users. Such an alert may prompt further diagnosis of the animal or at least prompt another user to visually inspect the condition of the animal.

Figure 19A:
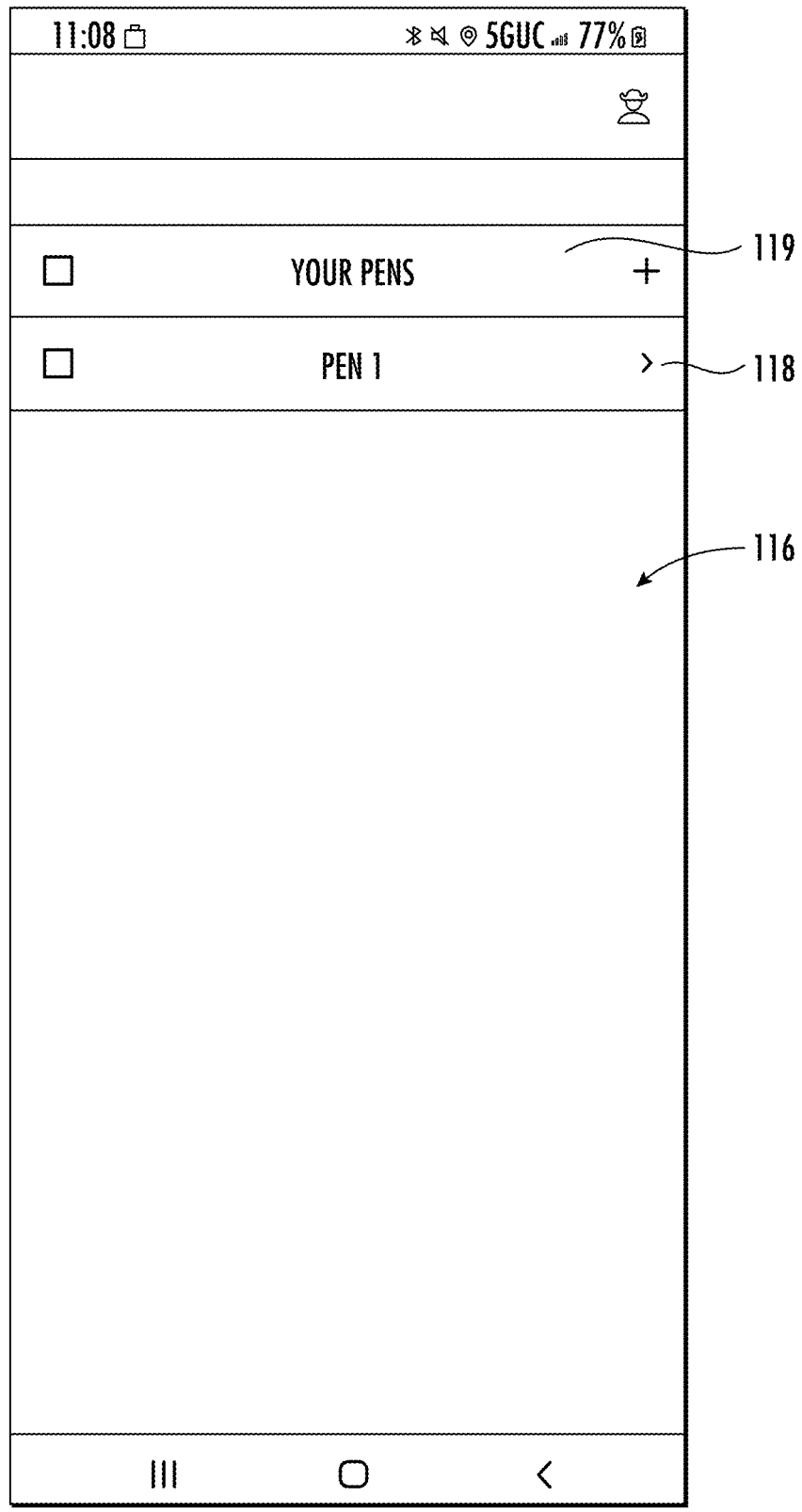
FIG. 19A is an exemplary pen listing screen, wherein a user can view the cattle pens that they manage or have access to according to an aspect of the present disclosure.
Figure 19B:
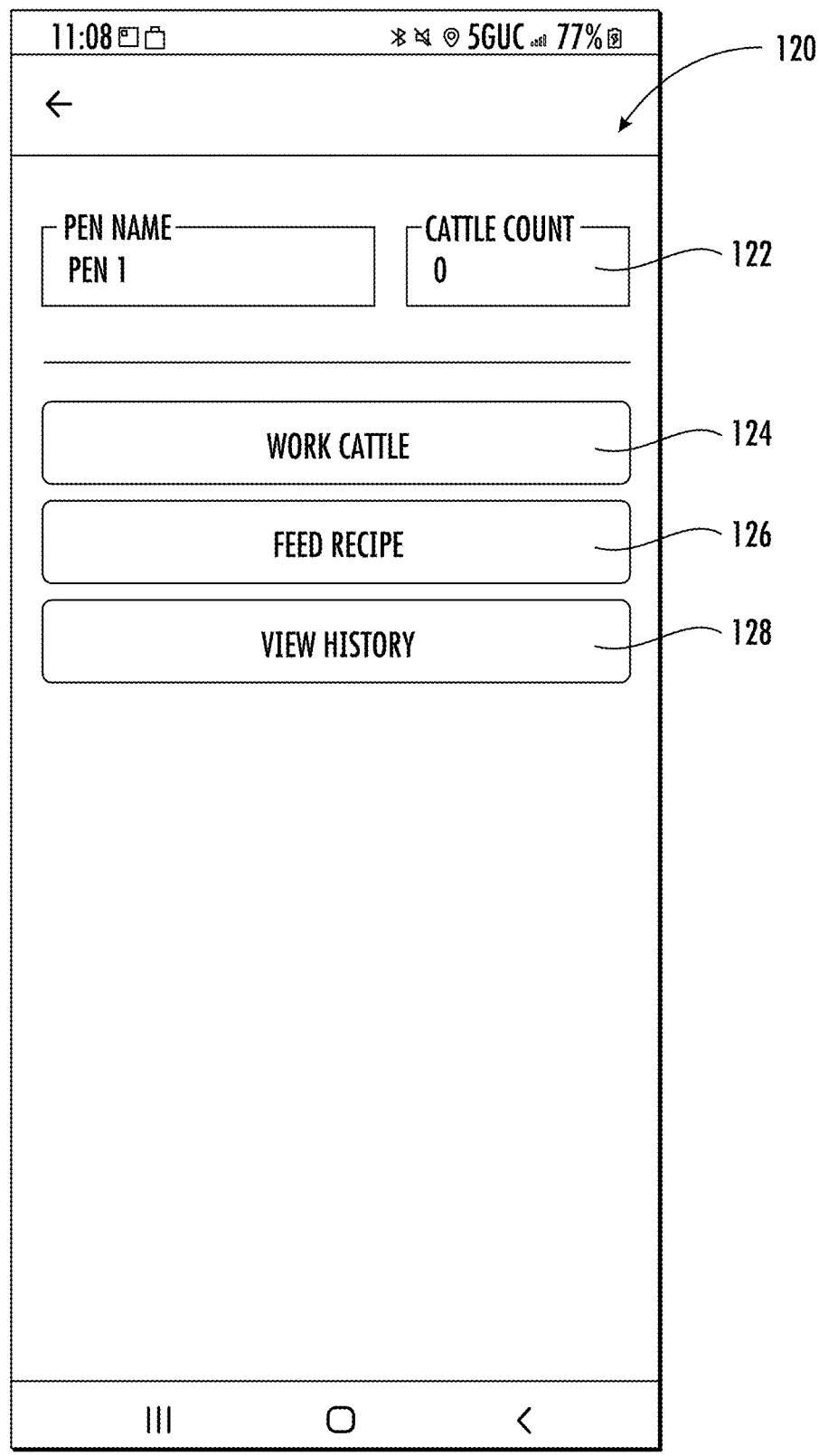
FIG. 19B is an exemplary pen screen that shows information for a particular pen and accessible through the pen listing screen according to an aspect of the present disclosure.

A number of different cattle pens or pastures may be saved within the software application (FIGS. 19A-B). When a user of the system logs into the software application, they will be brought to the "pens" page 116, which has each pen/pasture housing cattle or other animals that is owned and managed by a particular organization. Each pen 118 may be associated with a number of cattle as well as the feed and medicine given to the cattle within the particular animal pen. The user may add a pen using an add pen link 119 to the software application if they acquire a new one or if they have no existing pens in the application already. When a user selects a pen to monitor or edit, they may change the number of cattle within the pen with a fileable field 122 located on the pen information screen. From the pen information screen 120, the user may also view animal effecting factors such as feed and medicine used in the pen, as well as the logs detailing the history of the pen. These animal effecting factors can be tracked over time by the users to monitor the health and development of cattle within the particular pen. The user may select a work cattle link 124 to begin a session of treating cattle. A feed recipe link 126 shows information relating to the feed used as the pen. A view history link 128 allows a user to view and submit logs and historical data.

Monitoring the feed being used in the pen is one way to track cattle health and growth. The software application may be used in conjunction with a scale for measuring the weight of the cattle passing through the gate or chute. The weight could be input manually into the application or the scale may be in communication with the software application so that it records the cattle weights and updates the database automatically. If the cattle weight is different that what would be expected for their level of growth, than the user may wish to switch out their feed for one that will get their weight back on target. Weight changes may be sign of illness within the cattle herd, so it may also be desirable to change feeds to compensate. Within the pen information screen, a user may navigate to a listing of feeds that are provided to the cattle within the pen. There may only be one feed, or a plurality of feeds. The user may indicate within the software application what feed should be given to the cattle, so that that user or another different user may know to get different feed when providing meals for the cattle. The feed may be a feed recipe, and the user may change the recipe from the software application and so that it is visible to all users of the system. The user may change any ratios of the ingredients to fit cattle health requirements. Alternatively, the pen information screen may only have a single feed type listed, indicated that the single feed is what is intended to be given to the cattle within the pen. The software application may have a plurality of feed types stored therein that the single feed type may be pulled from and that the user selects.

Figure 22A:
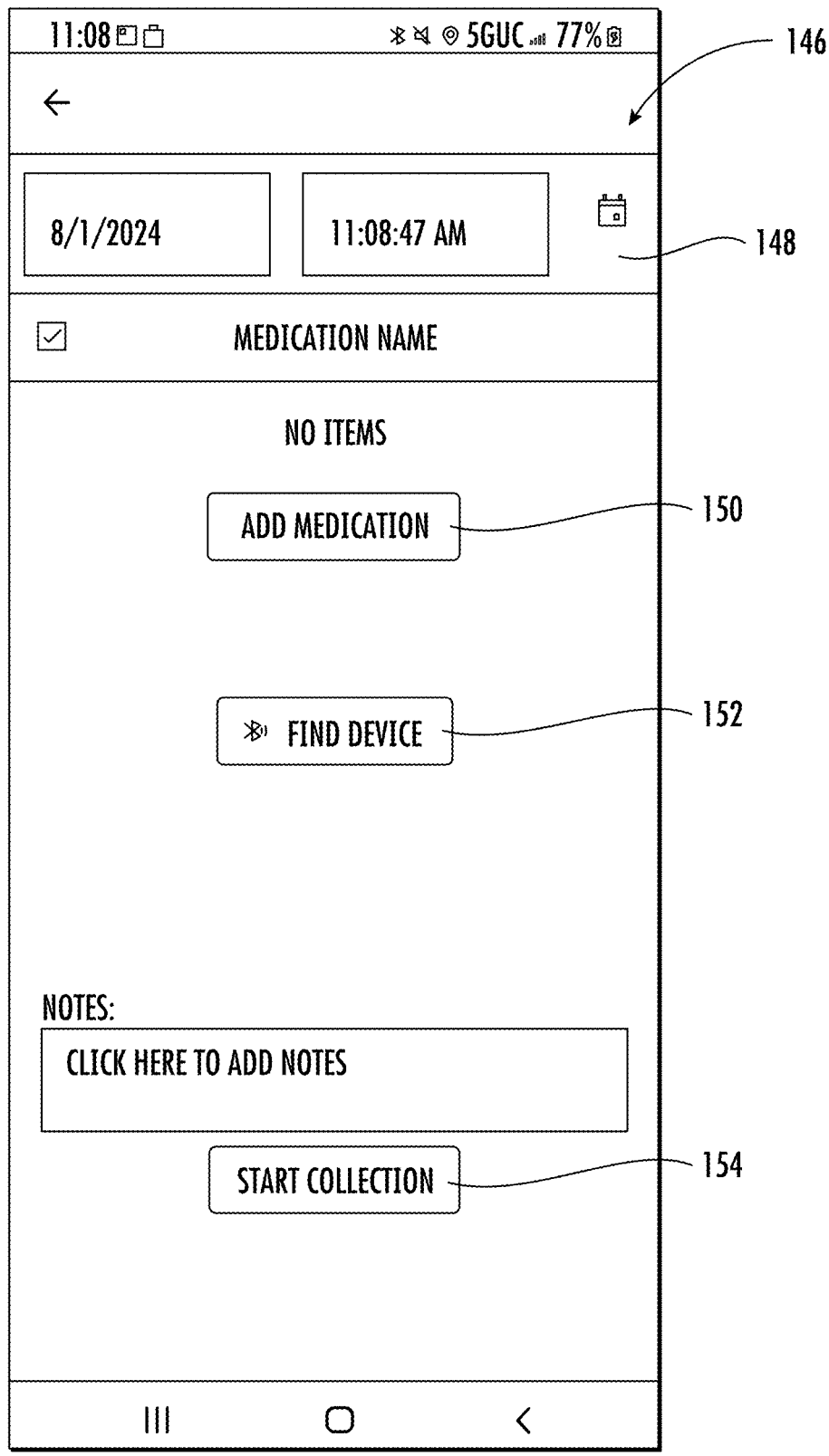
FIG. 22A is an exemplary medication listing screen wherein a user may view a listing of all medications input into the software application according to an aspect of the present disclosure.
Figure 22B:
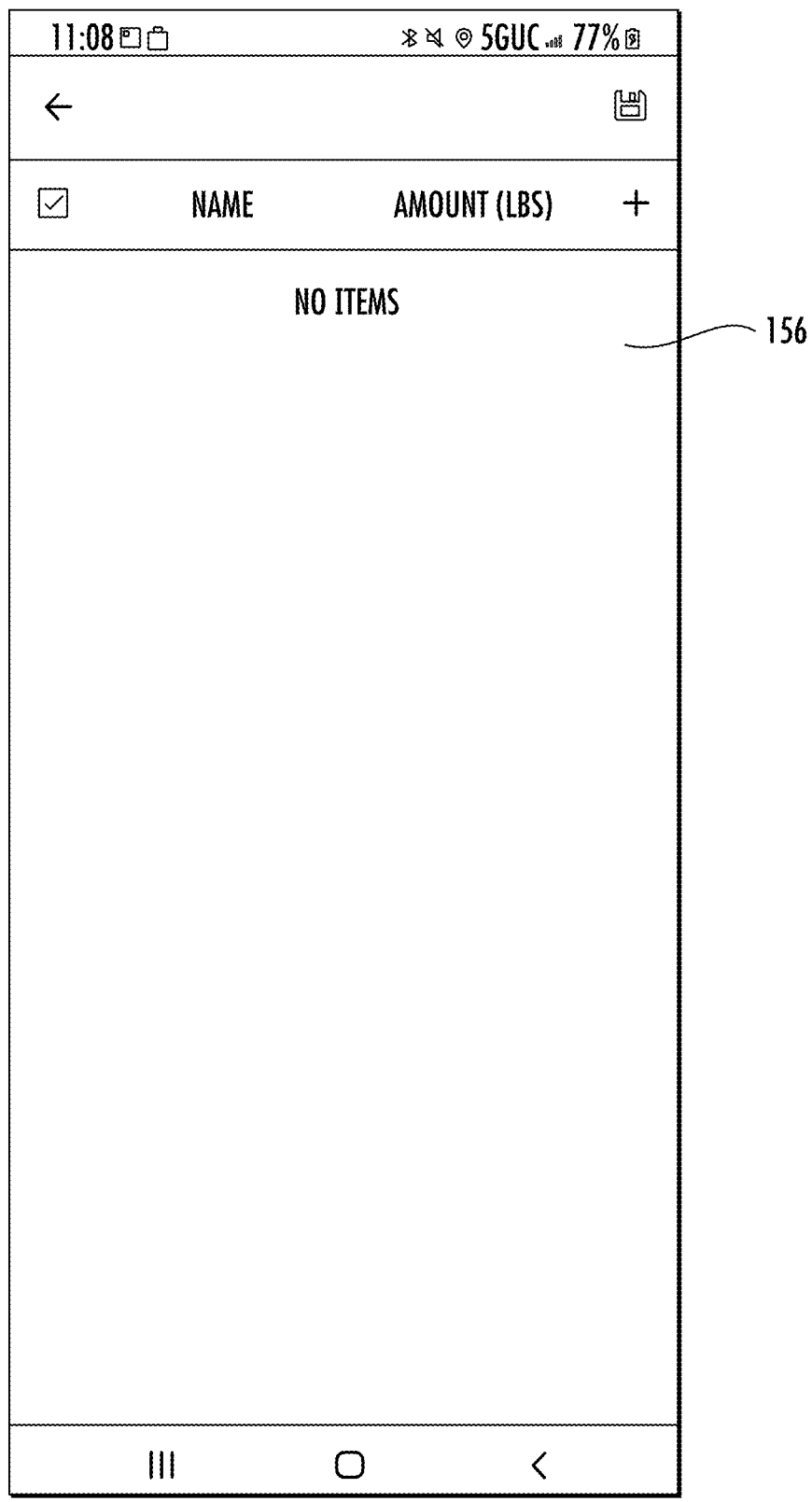
FIG. 22B is an exemplary add medication screen where a user, which may be any human authorized to use the system, but is typically a farmer and/or veterinarian authorized to help treat the animal(s) by the owner or farmer, may add a medication and an amount of the medicine to be used in connection with the system or pen according to an aspect of the present disclosure.

The software application also typically tracks what medicines/treatment chemicals are used at a particular pen for user monitoring and changes. A listing of all medicines 160 used at the pen is provided in a medicine collection screen 158 (FIG. 23). The volume per weight ratio of each medicine is provided next to the name/title of the medicine. The ratio is automatically used to calculate the volume of each medicine product that will be used when the user inputs the weight of the desired medicine into the medicine listing screen. This dosage may be adjusted on site or remotely by a user, including a veterinarian or a farmer or owner. When the user begins a session of applying medicine, they will first go to the medicine screen 146, which has an add medication link 150, a find device link 152, and a start collection link 154. The add medication allows a user to pick what medicine they will use for the session, and brings them to a select medication screen 156 (FIG. 22B) The find device link allows them to connect to an existing livestock treatment application system within the pen. The start collection link allows a user to input medicines into their collection if they do not have any already. The medicine screen also has a date and time bar 148 that a user will use to show when the session was undertaken. Notes may also be added to the session. The medicine could be a custom mixture composed of different ratios of medicine, or there may be multiple medicines that are applied to a cattle's back simultaneously or sequentially. Certain diseases or parasites may be more common during different times of the year, so a user may want to change what medicine or medicines are being used at that time.

When a user starts moving cattle through a cattle chute or gate, they will need to connect to the software application. The user first selects the pen that they are treating, although it is possible that the software application could determine this from the user's physical location and proximity to a pen. If the user has access to the pen, they can begin a medicine applying session, and the microcontroller of the junction box communicates with the user's computing device via the software application. The user selects the type of medicine that will be used in the session. The medicine is drawn from the preset list of medicines, although the user may also input a new one with a new weight/volume ratio before moving cattle through the chute. The microcontroller can now automatically determine the amount of medicine needed depending on the weight of the cow. The cows may move through the chute continuously, with lasers detecting the cattle's presence to activate the pump automatically, or the cows may move through one at a time with the pump being user activated and controlled. The amount of medicine used on each cow 11 is recorded automatically by the software application.

The software application also allows the user to create logs and monitor historical data. The logs contain any information that the users of the system believe would be helpful. A user could make an entry as a reminder for later for example. A user may also make an entry detailing a possible concern that they will need to track over time to verify if the concern is warranted. Photographs of individual animals may also be kept to visually see if the treatments are working over a period of time. A user may observe potential signs of illness within a herd, but does not know for sure. They can leave a note to themselves and others to verify later. The logs may be in the form of voice notes, where the user records themselves using a microphone on a user-operated computing device, and saves the recording to the database. Alternatively, the user may make written notes, which may be typed out using a keyboard on the user-operated computing device. Images could be saved to the database as well as discussed above and time stamped and geotagged for future analysis and review. A user could physically write themselves a note and take an image of the note as well and save it in the database associated with the mobile application. The user may take photos of the cattle or particular conditions of the pen, which may then be stored in the database. Photos allow the user to visually compare subjects in the photographs over time.

What is claimed is:

1. A livestock treatment application system comprising:
    an application subsystem that only applies at least one or more livestock treatment liquid to an upward-facing surface of an animal, wherein the application subsystem comprises:
        at least one livestock treatment liquid containing container that is housing one or more livestock treatment liquid chosen from the group consisting of a livestock treatment drug, a livestock nutritional supplement and mixtures thereof;
        an electromechanical pump, wherein the electromechanical pump is fluidly connected to the at least one livestock treatment liquid containing container via at least one flexible fluid transport line that is flexible by hand and without the use of tools and wherein the at least one flexible fluid transport line interconnects the at least one livestock treatment liquid containing container and the one or more livestock treatment liquid therein with the electromechanical pump and a nozzle, and wherein the electromechanical pump is in signal communication with a microcontroller; and
        wherein the nozzle is fluidly connected to the electromechanical pump via the at least one flexible fluid transport line, and wherein the nozzle is located proximate a top end of a livestock gate or chute and oriented downwards into the livestock gate or the chute such that the nozzle directs the at least one or more livestock treatment liquid onto the back of the animal within the livestock gate or the chute;
    wherein the microcontroller is contained within a waterproof junction box having a door and in wired or wireless electrical signal communication with at least each of the following:
    the electromechanical pump;
    a user activated switch on an exterior surface of the waterproof junction box configured to activate the electromechanical pump and dispense the at least one livestock treatment liquid upon activation of the user activated switch by a user; and
    a dosing selection subsystem system chosen from the group consisting of:
        a potentiometer within the waterproof junction box having a dose selection interface displayed to the user on the exterior surface of the waterproof junction box that is configured to be changed by the user by hand and without the use of tools such that the user may select a dose of the at least one livestock treatment liquid to be delivered through the nozzle and onto the upward-facing surface of a livestock; and
        at least one load cell in wired or wireless communication with the microcontroller wherein the at least one load cell provides a signal to the microcontroller that identifies a weight of the livestock to be treated by the application subsystem and wherein the microcontroller calculates or identifies the dose of the at least one livestock treatment liquid to be applied to the livestock.

2. The livestock treatment application system of claim 1 further comprising:
    an animal detecting subsystem configured to activate the electromechanical pump and dispense the at least one livestock treatment liquid upon the animal detecting subsystem identifying a presence of the animal at a location underneath the nozzle wherein the animal detecting subsystem comprises at least one animal detecting subsystem chosen from the group consisting of: a light beam system that has a light emitting source and a light receiving sensor; and the at least one load cell or a plurality of load cells.

3. The livestock treatment application system of claim 1, wherein the livestock treatment application system is engaged with the livestock gate or the chute chosen from the group consisting of: a squeeze gate with a livestock head locking mechanism; and an unobstructed tunnel system; and
 wherein the at least one load cell or a plurality of load cells are components of a scale for weighing the livestock to be treated by the livestock treatment application system.

4. The livestock treatment application system of claim 2, wherein the animal detecting subsystem consists of a laser emitter that emits a laser beam and a laser detector which detects the laser beam; and wherein the electromechanical pump is spaced within the waterproof junction box.

5. The livestock treatment application system of claim 1 further comprising one or more fluid detecting sensors engaged to the at least one flexible fluid transport line such that the one or more fluid detecting sensors provide signal regarding a presence of fluid within the at least one flexible fluid transport line, a rate of fluid flow through the at least one flexible fluid transport line or both to the microcontroller within a wired or wireless signal.

6. The livestock treatment application system of claim 1, wherein the electromechanical pump and the microcontroller are housed inside of the waterproof junction box, and wherein the waterproof junction box is secured to a side or the top end of the livestock gate or the chute via a bracket, and wherein the waterproof junction box has a plurality of openings for passage of the at least one flexible fluid transport line.

7. The livestock treatment application system of claim 1, further comprising a software application in signal communication with the microcontroller, wherein the software application displays a graphical user interface to a user on a user operated computing device, and wherein one or more livestock pens are displayed to the user on the graphical user interface where the one or more livestock pens correspond to an animal pen, enclosure or defined geographic region, and wherein the one or more livestock treatment liquid is:
 a first livestock treatment medicine and a first dosage by weight corresponding to a dosage for the first livestock treatment medicine; and
 a second livestock treatment medicine and a second dosage by weight corresponding to a dosage for the second livestock treatment medicine;
 wherein the first livestock treatment medicine, the first dosage by weight corresponding to the dosage for the first livestock treatment medicine, the second livestock treatment medicine, and the second dosage by weight corresponding to the dosage for the second livestock treatment medicine are each displayed to the user via the graphical user interface of the software application and corresponding data stored in a database associated with the software application;
 wherein the software application displays to the user which of the first livestock treatment medicine and the second livestock treatment medicine is currently being applied by the livestock treatment application system; and
 wherein the one or more livestock treatment liquid has a weight volume ratio associated with them, wherein the weight volume ratio corresponds to an amount of the at least one livestock treatment liquid that should be used per a unit of weight of the livestock.

8. The livestock treatment application system of claim 1, wherein the application subsystem further comprises a nozzle adaptor interposed between a nozzle engaging end of the at least one flexible fluid transport line and the nozzle and wherein the nozzle is a first nozzle that is removable from engagement with the nozzle adaptor by hand and without the use of tools and configured to engage a second nozzle having different dispensing characteristics than the first nozzle.

9. The livestock treatment application system of claim 8, wherein the nozzle adaptor comprises:
 a cylindrical main body;
 a fluid transport line engaging portion that extends upwardly from the cylindrical main body and having an internal channel, wherein the fluid transport line engaging portion is attached to the at least one flexible fluid transport line;
 a nozzle engaging cavity within the cylindrical main body having one or more locking channels disposed on an inner surface of the nozzle engaging cavity; and
 wherein the nozzle comprises an adaptor engaging portion that has substantially the same size and shape as the nozzle engaging cavity and one or more projections that correspond to the one or more locking channels of the nozzle engaging cavity.

10. A livestock treatment application system comprising:
 an application subsystem that only applies one or more livestock treatment liquid to an upward-facing surface of an animal, wherein the application subsystem comprises:
  at least one livestock treatment liquid containing container that is housing the one or more livestock treatment liquid;
  an electromechanical pump within a waterproof junction box, wherein the electromechanical pump is fluidly connected to the at least one livestock treatment liquid containing container via at least one flexible fluid transport line that is flexible by hand and without the use of tools and wherein the at least one flexible fluid transport line interconnects the at least one livestock treatment liquid containing container and the one or more livestock treatment liquid therein with the electromechanical pump and a nozzle, and wherein the electromechanical pump is in signal communication with a microcontroller; and
  wherein the nozzle is fluidly connected to the electromechanical pump via the at least one flexible fluid transport line; and
 wherein the microcontroller is contained within the waterproof junction box having a door and in wired or wireless electrical signal communication with at least each of the following:
 the electromechanical pump; and
 a dosing selection subsystem system chosen from the group consisting of:
  a potentiometer within the waterproof junction box having a dose selection interface displayed to a user on an exterior surface of the waterproof junction box that is configured to be changed by the user by hand and without the use of tools such that the user may select a dose of the at least one livestock treatment liquid to be delivered through the nozzle and onto the upward-facing surface of a livestock; and
  a livestock scale comprising at least one load cell in wired or wireless communication with the microcontroller wherein the at least one load cell provides a signal to the microcontroller that identifies a weight of the livestock to be treated by the application subsystem and wherein the microcontroller calculates or identifies the dose of the at least one livestock treatment liquid to be applied to the livestock.

11. The livestock treatment application system of claim 10, wherein the at least one livestock treatment liquid comprises an antiparasitic drug.

12. The livestock treatment application system of claim 11 further comprising a user activated switch on the exterior surface of the waterproof junction box configured to activate the electromechanical pump and dispense the at least one livestock treatment liquid upon activation of the user activated switch by the user.

13. The livestock treatment application system of claim 11 further comprising an animal detecting subsystem configured to activate the electromechanical pump and dispense the at least one livestock treatment liquid upon the animal detecting subsystem identifying a presence of the animal at a location underneath the nozzle wherein the animal detecting subsystem comprises at least one animal detecting subsystem chosen from the group consisting of: an optical sensor; a light beam system that has a light emitting source and a light receiving sensor; and the livestock scale.

14. The livestock treatment application system of claim 11 further comprising one or more fluid detecting sensors engaged to the at least one flexible fluid transport line such that the one or more fluid detecting sensors provide signal regarding a presence of fluid within the at least one flexible fluid transport line, a rate of fluid flow through the at least one flexible fluid transport line or both to the microcontroller within a wired or wireless signal.

15. The livestock treatment application system of claim 11, wherein the waterproof junction box is secured to a side or a top end of a livestock gate or a chute via a bracket, and wherein the waterproof junction box has a plurality of openings for passage of the at least one flexible fluid transport line and has a portion of one of the at least one flexible fluid transport line spaced within each of the plurality of openings within the waterproof junction box to deliver livestock treatment liquid to the electromechanical pump and from the electromechanical pump to the nozzle.

16. The livestock treatment application system of claim 13, wherein the animal detecting subsystem consists of a laser emitter that emits a laser beam and a laser detector which detects the laser beam; and wherein the electromechanical pump is spaced within the waterproof junction box.

17. A cattle treatment application system comprising:
an application subsystem that only applies one or more cattle treatment drug to an upward-facing surface of an animal, wherein the application subsystem comprises:
at least one cattle treatment drug containing container that is housing the one or more cattle treatment drug;
a first electromechanical pump within a junction box, wherein the first electromechanical pump is fluidly connected to the at least one cattle treatment drug containing container via at least one fluid transport line and wherein the at least one fluid transport line interconnects the at least one cattle treatment drug containing container and the one or more cattle treatment drug therein with the first electromechanical pump and a first nozzle, and wherein the first electromechanical pump is in signal communication with a microcontroller; and wherein the first nozzle is fluidly connected to the first electromechanical pump via the at least one fluid transport line and positioned to dispense a first cattle treatment drug onto only the back of a cattle along a spine of the cattle or within ten inches from the spine of the cattle during use; and
wherein the microcontroller is contained within the junction box having a door and in wired or wireless electrical signal communication with at least each of the following:
the first electromechanical pump; and
a dosing selection subsystem system chosen from the group consisting of:
a potentiometer within the junction box having a dose selection interface displayed to a user on an exterior surface of the junction box that is configured to be changed by the user by hand and without the use of tools such that the user may select a dose of the at least one cattle treatment drug to be delivered through the first nozzle and onto the back of the cattle; and
a cattle scale comprising at least one load cell in wired or wireless communication with the microcontroller wherein the at least one load cell provides a signal to the microcontroller that identifies a weight of the cattle to be treated by the application subsystem and wherein the microcontroller calculates or identifies the dose of a cattle treatment liquid to be applied to the cattle.

18. The cattle treatment application system of claim 17, wherein the cattle treatment application system further comprises a second electromechanical pump in fluid communication with a second cattle treatment drug and a second nozzle that is positioned to dispense the second cattle treatment drug onto only the back of the cattle along the spine of the cattle or within ten inches from the spine of the cattle during use.

19. The cattle treatment application system of claim 17, wherein the at least one fluid transport line is at least one flexible fluid transport line wherein the dose selection interface is a manually actuated dial or a digital interface with an up user input button to increase the dose and a down user input button to decrease the dose of the at lease tone livestock treatment drug to be applied using the cattle treatment application system.

20. The cattle treatment application system of claim 19, wherein the at least one cattle treatment drug comprises a topically administered drug for cattle chosen from the group consisting of: an antiparasitic, an antiprotozoal, an antihelminthic, an anticestode, an antitrematode, and an antifungal.

* * * * *